US 12,486,832 B2

(12) United States Patent
Singh et al.

(10) Patent No.: US 12,486,832 B2
(45) Date of Patent: Dec. 2, 2025

(54) SOLAR POWER GENERATION SYSTEM

(71) Applicant: HOLTEC INTERNATIONAL, Camden, NJ (US)

(72) Inventors: Krishna P. Singh, Jupiter, FL (US); Indresh Rampall, Cherry Hill, NJ (US)

(73) Assignee: HOLTEC INTERNATIONAL

( * ) Notice: Subject to any disclaimer, the term of this patent is extended or adjusted under 35 U.S.C. 154(b) by 0 days.

(21) Appl. No.: 18/451,235

(22) Filed: Aug. 17, 2023

(65) Prior Publication Data

US 2024/0410343 A1    Dec. 12, 2024

Related U.S. Application Data

(60) Provisional application No. 63/507,467, filed on Jun. 11, 2023.

(51) Int. Cl.
*F03G 6/00* (2006.01)
*F03G 6/06* (2006.01)
(Continued)

(52) U.S. Cl.
CPC ............. *F03G 6/071* (2021.08); *F03G 6/063* (2021.08); *F03G 6/065* (2013.01); *F03G 6/067* (2013.01);
(Continued)

(58) Field of Classification Search
CPC ..... F03G 6/00–129; F24S 60/00; F24S 60/10; F24S 20/40; F24S 10/30; F24S 80/20;
(Continued)

(56) References Cited

U.S. PATENT DOCUMENTS

| 1,109,923 | A | 9/1914 | Nicolai |
| 4,004,573 | A | 1/1977 | Frieling et al. |
| | | (Continued) | |

FOREIGN PATENT DOCUMENTS

| CN | 107013892 | 8/2017 |
| CN | 104279545 | 9/2017 |
| | (Continued) | |

OTHER PUBLICATIONS

International Search Report of PCT/US2024/032921, Issued Sep. 26, 2024.

*Primary Examiner* — Mark A Laurenzi
*Assistant Examiner* — Xiaoting Hu
(74) *Attorney, Agent, or Firm* — The Belles Group, P.C.

(57) ABSTRACT

A solar power generation system includes a thermal energy storage vessel containing a thermal mass composition operable to store thermal energy, solar energy collection system, and power generation system. The collection system comprises a first closed flow loop including a solar collector which absorbs solar energy and heats a first working fluid. The heated first working fluid recirculates through a first closed flow loop through and heats the thermal mass composition. The generation system comprises a second closed flow loop including a turbine-generator. The second closed flow loop recirculates a second working fluid through the thermal mass composition to absorb thermal energy and heat the second working fluid which flows to the turbine and the generator produces electricity. The second working fluid may be water/steam or a compressible gas. The thermal mass composition comprises a mixture of a phase change material such as salt and a metallic material.

2 Claims, 12 Drawing Sheets

(51) Int. Cl.
  *F24S 20/20* (2018.01)
  *F24S 70/60* (2018.01)
  *F24S 80/20* (2018.01)

(52) U.S. Cl.
  CPC .............. *F03G 6/117* (2021.08); *F24S 20/20* (2018.05); *F24S 80/20* (2018.05); *F24S 70/60* (2018.05)

(58) Field of Classification Search
  CPC ........ F24S 2080/03; F24S 60/20; F24S 60/30; F24S 10/70–755; F24S 20/20–25; F24S 23/00; F24S 23/70; F24S 2080/30; F24S 90/00; F24S 90/10; F24S 2020/23; G21D 5/16; F01D 15/10; F05D 2220/76; F28D 20/02–026
  See application file for complete search history.

(56) References Cited

U.S. PATENT DOCUMENTS

| | | | | |
|---|---|---|---|---|
| 4,341,262 A * | 7/1982 | Alspaugh | ............ | F28D 20/023 165/10 |
| 4,624,242 A | 11/1986 | McCall | | |
| 4,809,672 A | 3/1989 | Kendall et al. | | |
| 6,400,896 B1 | 6/2002 | Longardner | | |
| 9,638,064 B2 | 5/2017 | Iaquaniello et al. | | |
| 9,771,832 B2 | 9/2017 | Iaquaniello et al. | | |
| 10,113,536 B2 | 10/2018 | Wasyluk et al. | | |
| 2010/0089059 A1 | 4/2010 | Ferguson | | |
| 2010/0242949 A1* | 9/2010 | Kawashima | .......... | F24S 10/742 126/600 |
| 2011/0017196 A1* | 1/2011 | Bell | ........................ | F24H 1/208 126/400 |
| 2011/0114079 A1 | 5/2011 | Heckendorn | | |
| 2011/0226780 A1* | 9/2011 | Bell | ........................ | F28F 9/002 220/592.22 |
| 2012/0052457 A1 | 3/2012 | Saito et al. | | |
| 2013/0104546 A1* | 5/2013 | Goswami | ................ | F03G 6/066 60/641.8 |
| 2013/0199517 A1* | 8/2013 | Navio | ..................... | F24S 20/20 126/714 |
| 2013/0298964 A1 | 11/2013 | Pablo et al. | | |
| 2014/0000583 A1* | 1/2014 | Kotze | ..................... | F28D 20/02 126/618 |
| 2014/0251310 A1* | 9/2014 | Muren | .................. | F28F 13/003 165/157 |
| 2014/0290248 A1* | 10/2014 | Kobayashi | .............. | F03G 6/065 60/641.11 |
| 2014/0366536 A1* | 12/2014 | Muren | ..................... | F03G 6/065 126/618 |
| 2017/0254704 A1 | 9/2017 | Becker et al. | | |
| 2019/0134534 A1 | 5/2019 | Anton | | |
| 2019/0153284 A1 | 5/2019 | Meroueh et al. | | |
| 2020/0095984 A1* | 3/2020 | Karni | ..................... | F03G 6/064 |
| 2020/0325798 A1 | 10/2020 | Loewen et al. | | |
| 2020/0363132 A1* | 11/2020 | France | .................. | F28D 20/021 |
| 2021/0293406 A1 | 9/2021 | de Miranda Carvalho | | |
| 2021/0324765 A1 | 10/2021 | Conlon | | |

FOREIGN PATENT DOCUMENTS

| | | | | |
|---|---|---|---|---|
| CN | 209145783 | | 7/2019 | |
| CN | 111288428 | | 6/2020 | |
| CN | 111365086 | | 7/2020 | |
| EP | 2963290 A1 * | | 1/2016 | ............ F03G 6/005 |
| GB | 1524236 | | 9/1978 | |
| WO | WO2018/037324 A1 | | 3/2018 | |
| WO | WO2020091673 A1 | | 5/2020 | |

* cited by examiner

SOLAR POWER GENERATION SYSTEM

CROSS-REFERENCE TO RELATED APPLICATIONS

The present application claims the benefit of priority to U.S. Provisional Application No. 63/507,467 filed Jun. 11, 2023, which is incorporated herein by reference in its entirety.

FIELD OF THE INVENTION

The present invention relates to systems for producing electric power, and more particularly to such a system which utilizes solar energy to heat a thermal mass composition to produce steam for generating electric power via the Rankine cycle.

BACKGROUND OF THE INVENTION

Thermal energy reaching earth from the sun is quite immense. Yet, harnessing it for useful purposes has been difficult. For over 200 years, fossil fuels excavated from the ground have been the mainstay for energy supply needed to support human civilization. Solar energy, although ubiquitous and visibly strong between the equatorial and subtropical regions of the earth (between the lines of Cancer and Capricorn), drew little attention until the late 20th century when the nexus between the carbon spewed into the environment by burning of fossil fuels and global climate disruption became impossible to ignore. Solar energy generation, long an object of scant scientific work, now has been vaulted into a central area of academic and industrial research.

Improvements in renewable thermal energy systems are desired which can reduce reliance on fossil fuels and concomitantly decrease greenhouse gas emissions which contribute to global warming, and which has the ability to store solar thermal energy collected during the daytime for use any time of day upon demand.

SUMMARY OF THE INVENTION

A renewable solar power generation system is provided herein which supplants reliance on fossil fuels by providing efficient capture of the radiant solar heat energy incident on a solar collector and the conversion of the captured heat into useful forms such as without limitation high enthalpy steam to produce electric power, process or district heating steam, or alternatively to make portable hydrogen fuel as non-limiting examples. In other embodiments, the captured solar heat may be used to heat a compressible gas as explained herein.

The solar power generation system in one embodiment generally includes a solar energy collection system and a power generation system which are operably and thermally coupled together via an intermediary thermal energy storage system comprising a "green boiler" which in one embodiment may be formed by a thermal energy storage (TES) vessel. The solar energy collection system recirculates a first heat transfer working fluid ("first working fluid" for short) in a first closed flow loop between the solar collector and the TES vessel to transfer captured solar heat or thermal energy to a thermal mass composition contained in the TES vessel which is operable to absorb heat. The power generation system may be a steam power generation system in one embodiment which recirculates a second heat transfer working fluid ("second working fluid" for short) comprising water through a second closed flow loop between the thermal energy storage vessel and a steam turbine-generator set operable to produce electric power in a conventional manner. The turbine-generator set (also referenced to as a turbogenerator in the art for short) may form part of a Rankine steam to electric power generation cycle. The first and second flow loops are fluidly isolated from each other. Portions of the first and second closed flow loops inside and extending through the TES vessel are formed by respective bundles or banks of heat transfer tubes which convey the first and second working fluids through the thermal mass composition in the TES vessel. The TES vessel renders its stored thermal energy when desired on demand to heat the second working fluid to produce steam. The second working fluid (e.g., water) flows in the second closed flow loop which operates the power generation system (e.g., Rankine) cycle.

The first working fluid heated by solar energy circulating in the first closed flow loop of the solar energy collection system may be molten salt, which may be a eutectic salt mixture in one embodiment. Other suitable salts useful for thermal energy capture and transfer may be used. An alternative working substance or fluid which may be used in lieu of salt is a suitable synthetic heat transfer oil such as for example without limitation DOWTHERM™ available from Dow Chemical Inc. Heat transfer oil can be especially useful for lower temperature applications, for example <400 Deg. C. (working fluid temperature). The description presented herein in the context of molten salt for convenience of reference therefore also applies to synthetic heat transfer oil.

The TES vessel of the thermal energy storage system may be a heavily-insulated vessel which comprises first and second pluralities of heat exchanger tubes that are integral parts of the vessel and advantageously supported by a single outer housing efficiently mountable at the installation site on a single concrete foundation. This is distinguishable from using multiple separate components each with a separate housing and requiring separate foundations. The first and second pluralities of heat exchanger tubes each define multiple heat exchangers that are associated with and comprise integral fluidic flow components of each of the first and second closed flow loops, respectively. The first and second pluralities of heat exchange tubes are fluidly isolated from each other inside the TES vessel. The heat exchangers each comprise a tube bundle formed by the heat exchange tubes which are directly embedded and in conformal contact with the thermal mass composition inside the TES vessel, as further described herein. In sum, a first group of heat exchangers having heat exchange tubes associated with the first closed flow loop of the solar energy collection system transfer heat derived from solar radiation to the thermal mass composition. A second group of heat exchangers having heat exchange tubes associated with the second closed flow loop of the steam power generation system may each define a separate steam generator in some embodiments which are configured and operable to absorb heat from the thermal mass composition and convert the second working fluid (e.g., water) into steam for driving the steam turbine.

The TES vessel internally contains a "captive" bed of the thermal mass composition formulated and operable to absorb and store heat derived from the heat exchange tubes embedded therein which circulate the solar-heated first working fluid via the first closed flow loop through the bed. Conversely, the bed then yields the stored heat energy on demand to the heat exchange tubes embedded therein which circulate the Rankine cycle second working fluid (e.g., water) to convert the liquid phase water to steam for powering the steam turbine. The term "captive" used above connotes that the thermal mass composition remains stationary and does not flow into or out of the vessel in contrast to the first and second working fluids.

The thermal mass composition in one non-limiting embodiment may comprise a mixture including a phase change material (PCM) in combination with one or more other metallic materials as further described herein; all of which have heat absorption properties operable to absorb and retain heat over a period of time. Both the PCM and metallic materials of the mixture may be in the form of solid granular particles at ambient temperatures when not heated by the thermal mass composition. The PCM material preferably has a lower melting temperature than the metallic materials in one embodiment such that PCM material melts when initially heated by the first working fluid (e.g., molten salt or heat transfer oil) while the metallic materials remain in a solid particle state.

The TES vessel of the solar power generation system allows solar energy derived from the solar collector to be stored during periods of time when sunlight is available. Electric power can be generated concurrently during those times to meet the demands of the electric power grid, or at other times when the sun is not shining such as during the evening hours. This versatility also allows the solar power generation system to advantageously operate either continuously as a base load power generation unit, or intermittently as a peak load unit.

For peak load electric power generation, the TES vessel with heat exchangers associated with the second working fluid is configured and functions to boil the feed water/feedwater to produce the high-pressure superheated steam needed for the Rankine power generation cycle to produce electric power "on demand" whenever the grid faces a deficit of electricity to meet current load demand. Thus, when the grid faces a power deficit, the solar power generation system disclosed herein can serve as a peaking power generation unit further replacing traditional smaller natural gas or diesel peak power generation units (often sited at large base load fossil generating plant sites) traditionally used for peak power during electric load swing periods of the power grid.

The term "closed flow loop" as used herein means that a fluid flow path is defined in which the fluid can flow in a recirculating manner through the loop and does not preclude the provision of various fluid inputs and fluid outputs to/from the flow loop.

It bears noting that the terms "first working fluid" and "second working fluid" used in the written description herein may refer to different fluids in the claims depending on the order in which the fluids are introduced in the claims. Accordingly, the first working fluid might refer to the working fluid associated with power generation system whereas the second working fluid might refer to the working fluid associated with the solar energy collection system in the claims. These terms are therefore to be construed in the context in which they are being discussed and presented.

According to one aspect, a solar power generation system comprises: a thermal energy storage vessel defining an internal space containing a thermal mass composition operable to store thermal energy; a solar energy collection system comprising a first closed flow loop including a solar collector configured to absorb solar energy and heat a first working fluid, the first closed flow loop configured to circulate the heated first working fluid through and heat the thermal mass composition in the thermal energy storage vessel; a power generation system comprising a second closed flow loop including a turbine, the second closed flow loop configured to circulate a second working fluid through the thermal energy storage vessel to absorb thermal energy from the thermal mass composition and heat the second working fluid for introduction to the turbine; and an electric generator operably coupled to the turbine to produce electricity. In some embodiments, the first working fluid working fluid may be molten salt or heat transfer oil, and the second working fluid may be water which enters the thermal energy storage vessel in a liquid states and leaves as steam. In other embodiments, the second working fluid may be a gas such as carbon dioxide.

According to another aspect, a method for generating electricity using solar energy comprises: providing a thermal energy storage vessel containing a thermal mass composition having a formulation operable to store thermal energy; heating a first working fluid using solar radiation; flowing the heated first working fluid through the thermal mass composition to heat the thermal mass composition; flowing a second working fluid through thermal mass composition; heating the second working fluid via the second working fluid absorbing heat from the thermal mass composition; and flowing the heated second working fluid to a turbine-generator operable to generate electricity. In some embodiments, the first working fluid working fluid may be molten salt or heat transfer oil, and the second working fluid may be water which enters the thermal energy storage vessel in a liquid states and leaves as steam. In other embodiments, the second working fluid may be a gas such as carbon dioxide.

BRIEF DESCRIPTION OF THE DRAWINGS

The features of the exemplary embodiments of the present invention will be described with reference to the following drawings, where like elements are labeled similarly, and in which.

Figure 1:
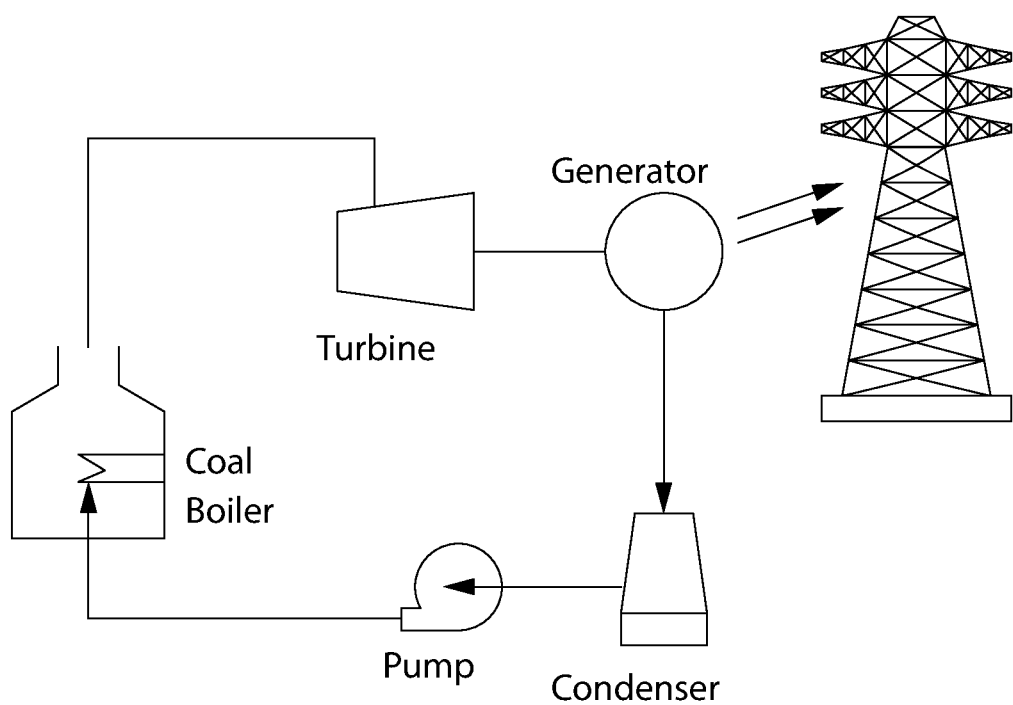
FIG. 1 is a schematic diagram of a conventional Rankine power generation cycle system using a polluting fossil-fueled boiler to produce steam.

All drawings are schematic and not necessarily to scale. Parts given a reference numerical designation in one figure may be considered to be the same parts where they appear in other figures without a numerical designation for brevity unless specifically labeled with a different part number and described herein. Any reference herein to a whole figure number herein which may comprise multiple figures with the same whole number but different alphabetical suffixes shall be construed to be a general reference to all those figures sharing the same whole number, unless otherwise indicated.

DETAILED DESCRIPTION OF THE EMBODIMENTS

The features and benefits of the invention are illustrated and described herein by reference to exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein to prior patents or patent applications are hereby incorporated by reference in their entireties. In the event of a conflict in a definition in the present disclosure and that of a cited reference, the present disclosure controls.

FIG. 1 shows a conventional power generation steam-to-electric Rankine power generation cycle with a large-scale fossil-fueled boiler to generate steam necessary for power production. The basic cycle equipment (excluding auxiliary systems) includes the fossil fuel fired boiler (e.g., coal, oil, or natural gas), steam turbine-generator set, steam condenser which condenses steam exhausted from the steam turbine back into a liquid state, and boiler feedwater pump which takes such from the condenser circulates the boiler feedwater (heat transfer fluid) through a closed flow loop formed by piping which fluidly couples the components together as shown. The electric generator is mechanically coupled to steam turbine and electrically coupled to the power grid (represented by the power line transmission tower shown). Steam produced by the boiler rotates the turbine shaft via the rows of turbine blades, which in turn rotates the rotor of the generator within the stator (magnets) to convert mechanical energy into electric energy in a known manner. The Rankine cycle power generator system and its operation for generating electric power is well known to those skilled in the art without further elaboration necessary.

The fossil-fueled boilers in Rankine systems which convert the boiler feedwater in a liquid state to high pressure steam are traditionally used for base electric load operation to satisfy the base load demand of the power grid since such boilers and associated auxiliary equipment cannot be quickly started for on-demand power generation. In fact, the entire startup process for fossil-fueled base load plants takes many hours to bring all equipment and the system up to full pressure and temperature operating conditions to reach full load.

Figure 2:
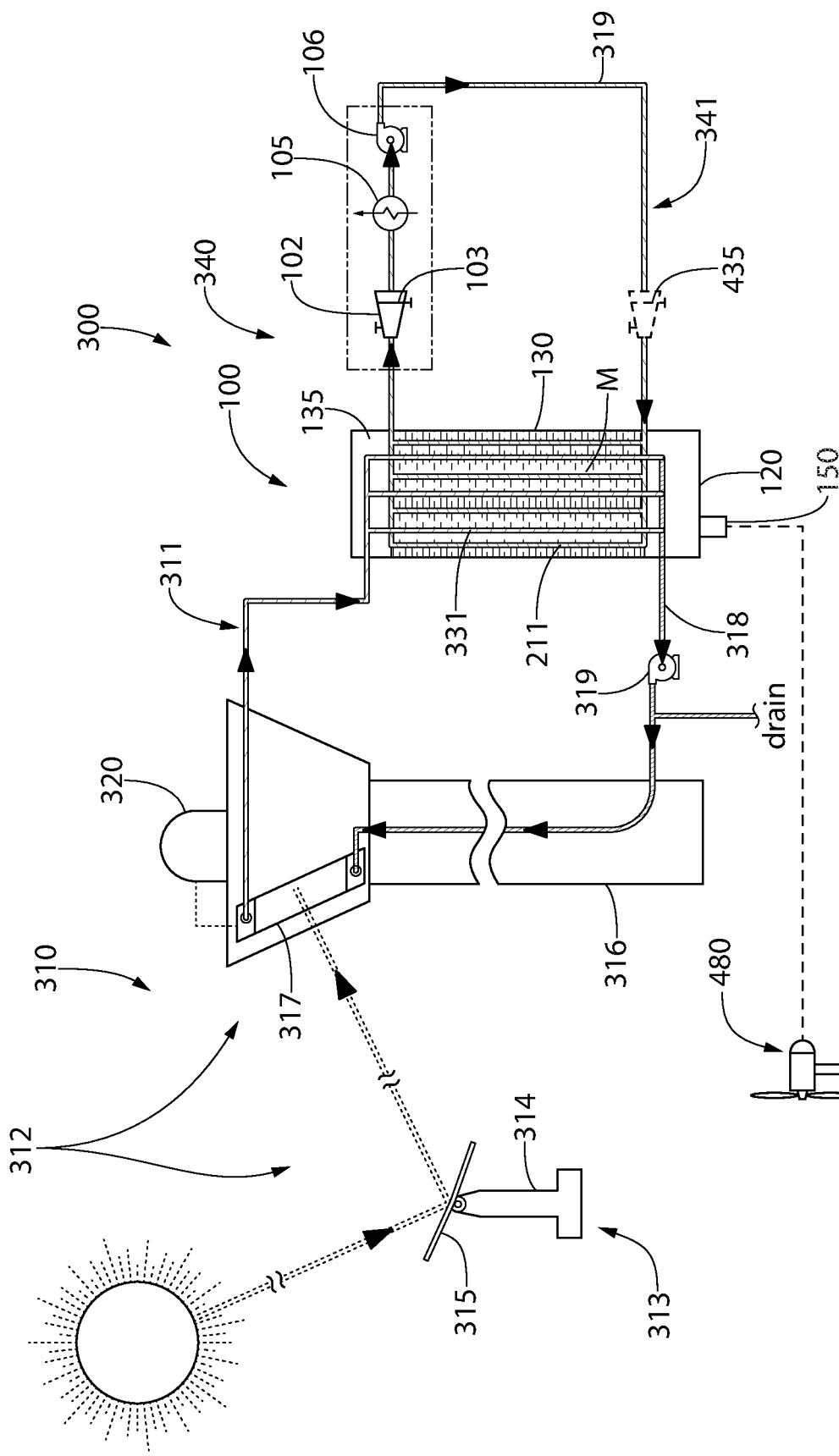
FIG. 2 is a schematic flow diagram of a solar power generation system according to the present disclosure which includes a solar energy collection system, power generation system, and thermal energy storage system.

FIG. 2 is a schematic system flow diagram showing a solar power generation system 300 according one embodiment of the present disclosure. The system in part may include a Rankine steam power cycle which derives input energy from solar thermal energy capture in lieu of fossil fuels to generate the steam necessary to produce electricity.

The solar power generation system 300 in one embodiment generally includes solar energy collection system 310 comprising solar collector 312, power generation system 340 comprising a steam turbine 341 and electric generator 342, and thermal energy storage system 100 which operably and thermally couples the systems 310 and 340 together. Systems 310 and 340 however are fluidly isolated from each other. As further described herein, the intermediary thermal energy storage system 100 comprises "green boiler" 120, which in one embodiment may be formed by thermal energy storage (TES) vessel 130 containing a thermal mass composition M specially configured and operable to absorb heat energy and yield the heat energy on demand to produce steam for driving the power generation system 130.

Solar energy collection system 310 is configured to circulate the first heat transfer working fluid ("first working fluid" for short) in a first closed flow loop 311 between the solar collector 312 and the TES vessel 130 where the captured solar heat or thermal energy from the collector is used to heat to thermal mass composition M contained in the TES vessel. Flow conduits 318 form integral external portions of the first flow loop 311 to circulate the first working fluid between solar collector 312 and TES vessel 130. In one embodiment, the flow conduits 318 may be formed by piping made of a material suitable for handling the temperatures, pressures, and chemistry of the first working fluid. The flow conduits may be insulated and if necessary heat traced in some embodiments to minimize heat loss from the first working fluid. The first closed flow loop 311 includes at least one recirculation pump 319 which provides the motive force to recirculate the first working fluid through the first closed flow loop. Pump 319 may be located in first closed flow loop 311 upstream of the power tower 316 but downstream of TES vessel 130 as shown in FIG. 2.

The first working fluid may be molten salt or heat transfer oil in some embodiments as previously described herein. Other suitable heat transfer working fluids however may be used if appropriate.

The solar collector 312 in one embodiment may be a concentrated solar power (CSP) collector which comprises a circular array of heliostats 313 that encircle the centrally-located power tower 316 (only one heliostat being shown in FIG. 2 for sake of brevity). Heliostats are is commercially available in a wide range of sizes and curvatures from multiple suppliers. The power tower 316 receives thermal energy delivered to it by the heliostats. Heliostats 313 each generally include a support frame 314 typically mounted on the ground (or another available support surface) and an adjustable reflector 315 configured to capture and reflect incident solar radiation or light. The reflectors in one embodiment may each be formed by a concave mirror with radius of curvature set to focus solar energy incident on its surface onto thermal receivers 317 mounted on the upper portion of the tall columnar power tower. The sun's radiant energy (heat) is collected by the concave mirrors mounted on a drive mechanism that enables the mirrors to index and continuously face towards the sun as it traverses the sky through the day to optimize the amount of solar radiation captured. The receivers may be positioned at multiple elevations in a sufficiently tall power tower 316 so that radiant heat energy of the sun can be more effectively captured from a large heliostat field. The receivers 317 are integral fluidic parts of the first closed loop 311 which serve to convey the received thermal energy from the sun to the TES vessel 130 which in turn is interfaces with the power generation system 340. The receivers 317 are heat exchangers with heat exchange tubes as further described herein which serve as the entry point for the thermal energy input into the solar energy collection system, which heats the recirculating first working fluid to a desired target temperature.

The CSP system disclosed herein may utilize an optimization algorithm that maximizes the total solar exposure to the array of heliostats on a given land area. This optimization formalism considers the plot size and latitude of the plant's location. The Heliostats' size and their spacing are available parameters that can be varied to arrive at the highest solar energy capture configuration. Calculations show that in the region between the line of Capricorn and the line of Cancer, daily Energy Capture Density (ECD) as high as 5 MWh per acre of heliostat-seeded land can be achieved. In more temperate regions of the earth, the ECD may be somewhat less, down to ~4 MWh per acre.

Figure 3:
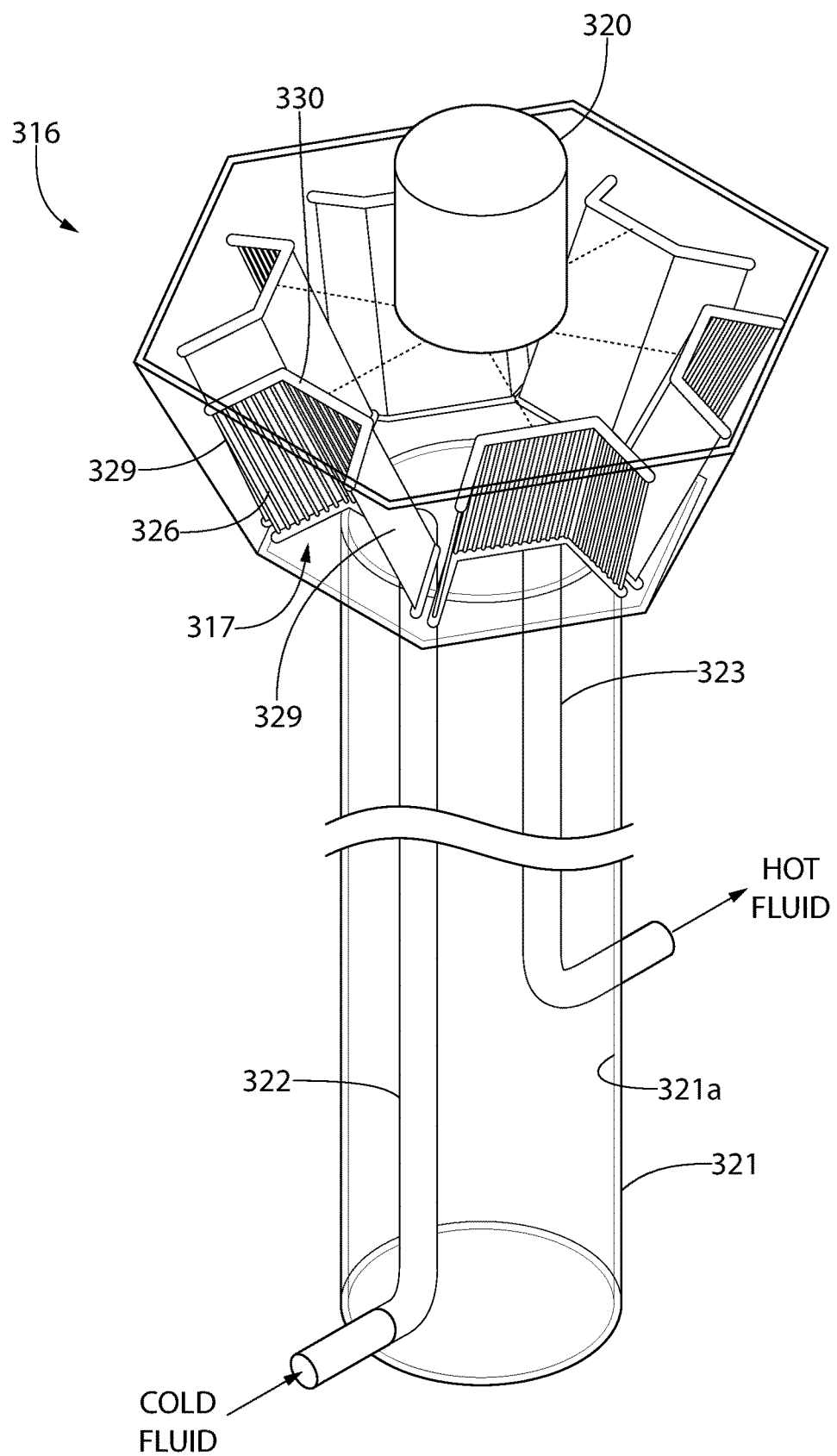
FIG. 3 is a perspective view of one embodiment of a power tower of a concentrated solar power solar collector of the solar energy collection system.
Figure 4:
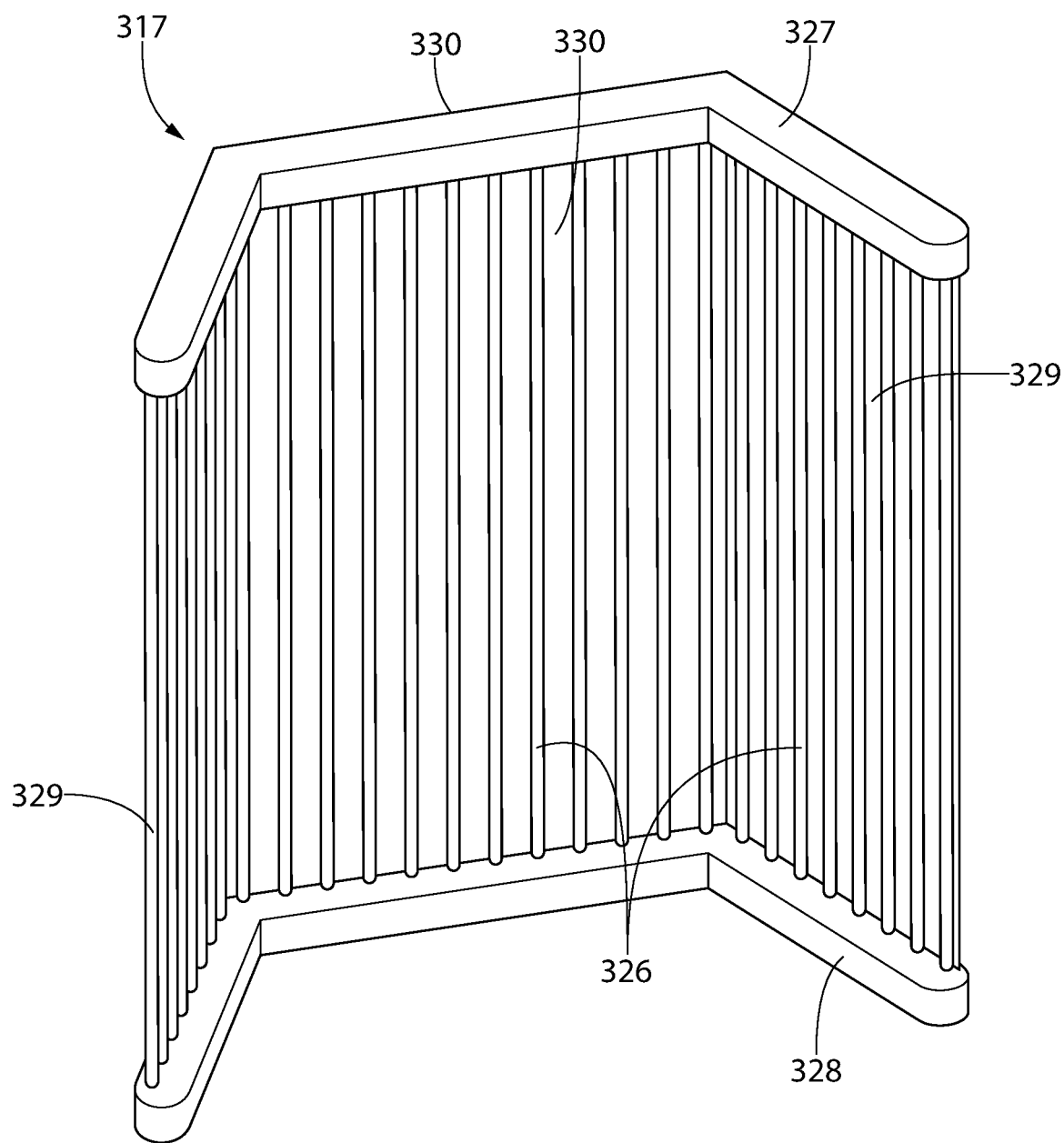
FIG. 4 is a perspective view of a thermal receiver of the power tower.

FIGS. 3-4 show additional detail and features of power tower 316 and the thermal receivers 317. The power tower 316 may include a vertically elongated structural support tube 321 configured for mounting on the ground, such as on a suitable concrete foundation F to which the tube may be bolted or otherwise secured. The support tube may be cylindrical with a circular cross-sectional shape in one embodiment as shown; however other suitably shaped structures including various polygonal shapes may be used. At least a portion of the interior 321a of support tube 312 may be hollow to permit a "cold leg" fluid riser pipe 322 and "hot leg" fluid downcomer pipe 323 to be routed internally in the support tube to/from the plurality of thermal receivers 317 mounted at the top of the support tube. The internal routing of the riser and downcomer inside the support tube 321 advantageously mitigates the effect of heat dissipaters such as wind and rain. The riser and downcomer pipes 322, 323, which may be insulated and if necessary heat traced, are fluidly coupled directly or indirectly to each of the receivers 317. Piping manifolds (not shown) of suitable configuration such as circular be used in some embodiments to distribute the cold first working fluid to each receiver, and in turn collect the heated first working fluid from the receivers.

The terms "cold leg" and "hot leg" refer to the relative temperature of the first working fluid (e.g., molten salt or heat transfer oil) after the fluid yields its heat to thermal mass composition M in the TES vessel 130 (cold leg) and enters the solar collector 312, and before the fluid yields its heat obtained from the solar collector 312 to the thermal mass composition, respectively.

The prismatic power tower structure enables extremely tall columns to be built thus enabling multiple rows of thermal receivers to be installed and operated. The cylindrical cross section of the power tower enables thermal receivers 317 to be installed in multiple circumferential orientations such that the radiant energy of the sun can be more fully captured where its trajectory in the sky is favorable to such design. In some embodiments, receivers 317 may be provided at multiple elevations in a sufficiently tall power tower 316 so that radiant solar energy can be more effectively captured from a large array of heliostats 313.

In one embodiment, the recirculation pump 319 may be located in first closed flow loop 311 upstream of and near the bottom of the riser pipe as shown in FIG. 2. In this configuration, which nonetheless is acceptable, the recirculation pump is at a disadvantage as it is pumping against a hydrostatic pressure differential or head due to density differences in the hot and cold first working fluid columns (e.g., molten salt columns if used) in the riser and downcomer piping. This increases the pump motor horsepower requirements and energy consumption.

Figure 10:
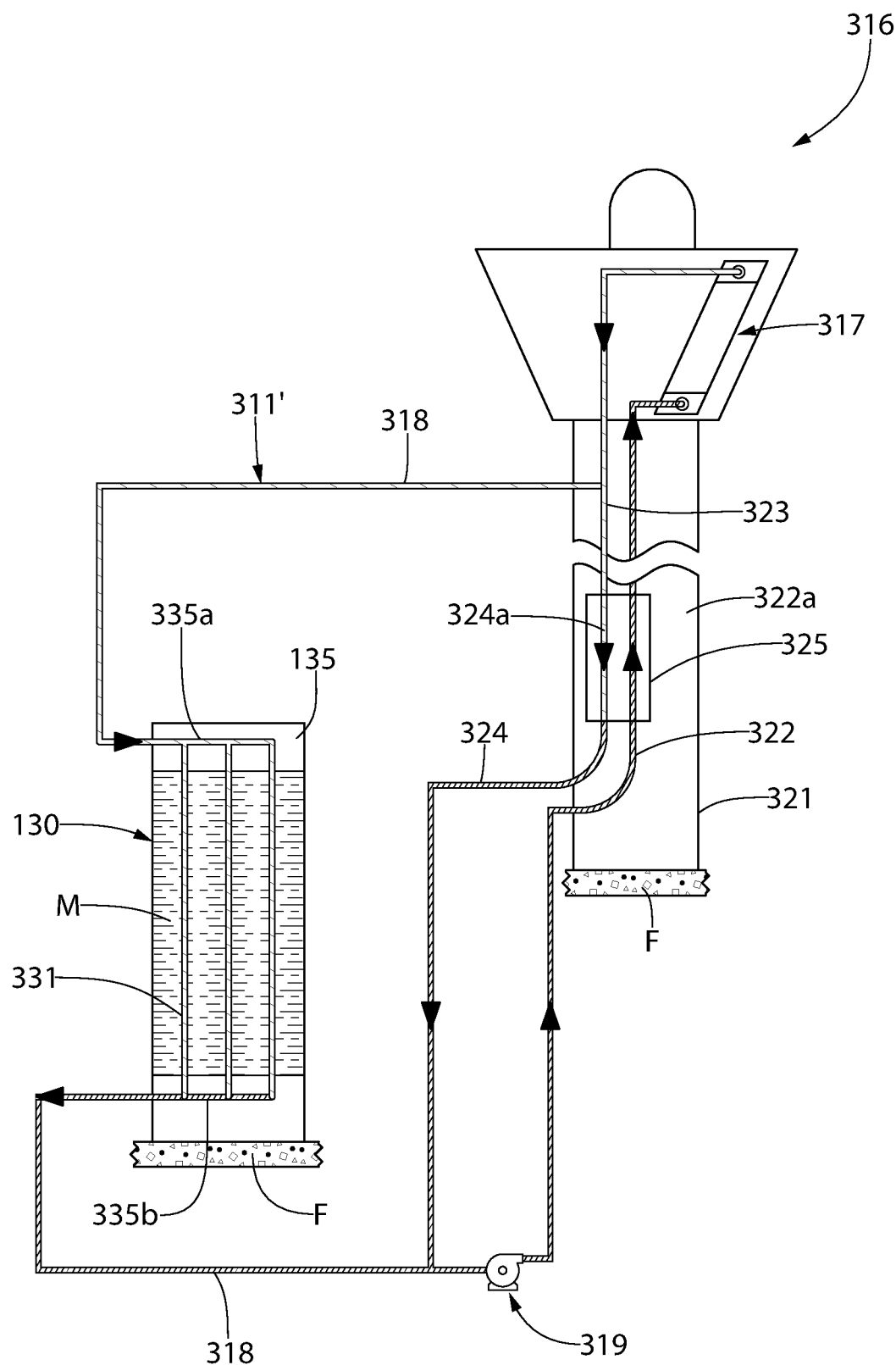
FIG. 10 is a schematic flow diagram of an alternative second embodiment of the solar energy collection system with a heat transfer fluid preheater.

In FIG. 10, an enhanced first closed flow loop 311' is disclosed which is configured and designed to mitigate the foregoing pressure differential effect and reduce energy consumption for pumping the cold first working fluid to the top of the power tower 316 to reach the thermal receivers 317. As shown in this figure, a portion of the hot first working fluid heated by and exiting the power tower receivers 317 (only one shown in this figure for brevity and clarity) is extracted and flows through a bypass piping loop 324 to a preheater 325 used to preheat the cold first working fluid returning from TES vessel 130 and entering the tower after it enters the riser pipe 322. Preheater 325 may be a heat exchanger which may be disposed inside support tube 321 in one embodiment; however, other embodiments may locate the heat exchanger external to the support tube.

In one non-limiting arrangement, preheater 325 may be a shell and tube heat exchanger well known in the art which includes an outer shell 322a housing internally a first array of heat exchange tubes 324a fluidly coupled to the bypass piping loop 324 on the tube side forming the hot side heat transfer medium. The cold or cooled first working fluid in riser pipe 322 may flow through the heat exchanger on the shell side in contact with the exterior of tubes 324a forming the cold side heat transfer medium. This flow arrangement may be reversed in other embodiments. The heat exchanger may be a counter-current flow design in some embodiments as shown; however, parallel flow current designs could also be used where appropriate. The cold first working fluid in the riser is heated in the preheater 325 and advantageously now enters each thermal receiver 317 in a partially heated condition before reaching the thermal receivers. In this manner, the first working fluid columns temperature differential noted above (e.g., molten salt columns if used as the first working fluid) in the riser and downcomer piping is reduced, and concomitant hydrostatic pressure differential mitigated. This enhanced flow Recirculation Loop may be especially beneficial if synthetic heat transfer oil, such as DOWTHERM™ is used as the heat transfer fluid. Other types of heat exchangers may be used. It bears noting that the heat exchanger 325 and bypass piping loop 324 form integral fluidic parts of the first closed flow loop 311.

In other embodiments, the preheater may be configured as a double pipe heat exchanger (e.g., pipe within a pipe).

Referring to FIGS. 3 and 4, the plurality of thermal receivers 317, which form integral fluidic parts of the first closed flow loop 311, each comprise a plurality of heat exchange tubes 326 fluidly coupled between a top outlet header 327 and a bottom inlet header 328. The first working fluid flows inside on the tubeside of tubes 326 through the receivers between the headers. The inside surface of the half tubes may have micro-roughness patterns in the shape of cones to increase the heat transfer between the tube surface and the fluid flowing through the tubes. The headers can be configured to create multi-pass first working fluid flow paths through the tube bundle, if necessary, to affect the required amount of heating of the first working fluid.

In one embodiment, heat exchange tubes 326 of each receiver may be arranged in tube walls including a pair of end tube walls 329 obliquely angled with respect to each other, and an intermediate tube wall 330 therebetween which in turn is obliquely angled to the end tube walls. This arrangement gives each receiver 317 a generally (but not perfectly) C-shaped structure which forms an outwardly open cavity as shown in order to reduce the heat losses from the receivers to the ambient environment.

In one embodiment, each thermal receiver 317 therefore is a curvilinear structure which emulates a plate-type heat exchanger. The heat transfer surface which absorbs solar radiation in one embodiment may be made of metal sheets of undulating profile welded to a thick flat plate insulated on its back surface. Each undulation in the sheet serves as an autonomous heat transfer space forming heat exchange tubes 326 with a cross section approximating a half-tube (e.g., semi-circular). The first working fluid flows inside the "half-tubes" picking up the solar radiant heat deposited on its outward facing surface by the heliostats 313. The receiver tube surface facing the Heliostat may be coated with a material that has high absorptivity in the solar wavelength range, but a low emissivity in the infrared wavelength range. The receivers 317 may be arranged in a circumferential array adjacent to each other to receive the reflected and concentrated solar energy or radiation (i.e. light) flux from the heliostats for a full 360 degrees of the solar field for low latitude areas of the world. For high latitudes, the receivers are designed to receive the concentrated radiation flux from the north side of the tower in the northern hemisphere and from the south side of the tower in the southern hemisphere. Accordingly, a number of variations are possible to adjust to and maximize the solar site conditions and location.

The power tower 316 may further include an expansion tank 320 situated above the thermal receivers 317 to accommodate changes in the density of the first working fluid with temperature. Expansion tank 320 may be fluidly coupled to each receiver at a suitable fluid connection point, such as the top headers in one non-limiting embodiment (see, e.g., FIG. 3 dashed lines). Other suitable fluid connection locations to the receivers may be used.

Referring to FIG. 2, the power generation system 340 of the solar power generation system 300 may a steam power generation system generally including without limitation a conventional steam turbine-generator set including steam turbine 102, electric generator 103 mechanically coupled thereto and operably connected to the electric power grid, steam condenser 105 which condenses the steam into condensate, and boiler feedwater pump 106. These components (excluding the generator of course) form integral fluidic parts of the second closed flow loop 341 along with the heat exchange portion of the green boiler 120 (TES vessel 130) which conveys the second working fluid therethrough to absorb heat from the thermal mass composition M to produce steam which runs the steam turbine-generator set to generate electricity. The generator produces electricity in a conventional manner via a stator and rotor assembly well known in the art. The feedwater pump 106 circulates the boiler feedwater through the second closed flow loop 341 formed in part by flow conduits 319 such as piping which fluidly couples the water bearing components of the Rankine cycle and TES vessel together as shown. With exception of the present green boiler, the remaining balance of plant components of the clean energy Rankine cycle necessary to form a complete power generation system may be provided and operate in the same foregoing and well known manner as traditional Rankine cycle components to produce electricity.

It bears noting that the TES vessel 130 can generate steam with pressures up to about and including 3000 psi to meet a variety of steam power electric generation needs and applications.

Figure 5:
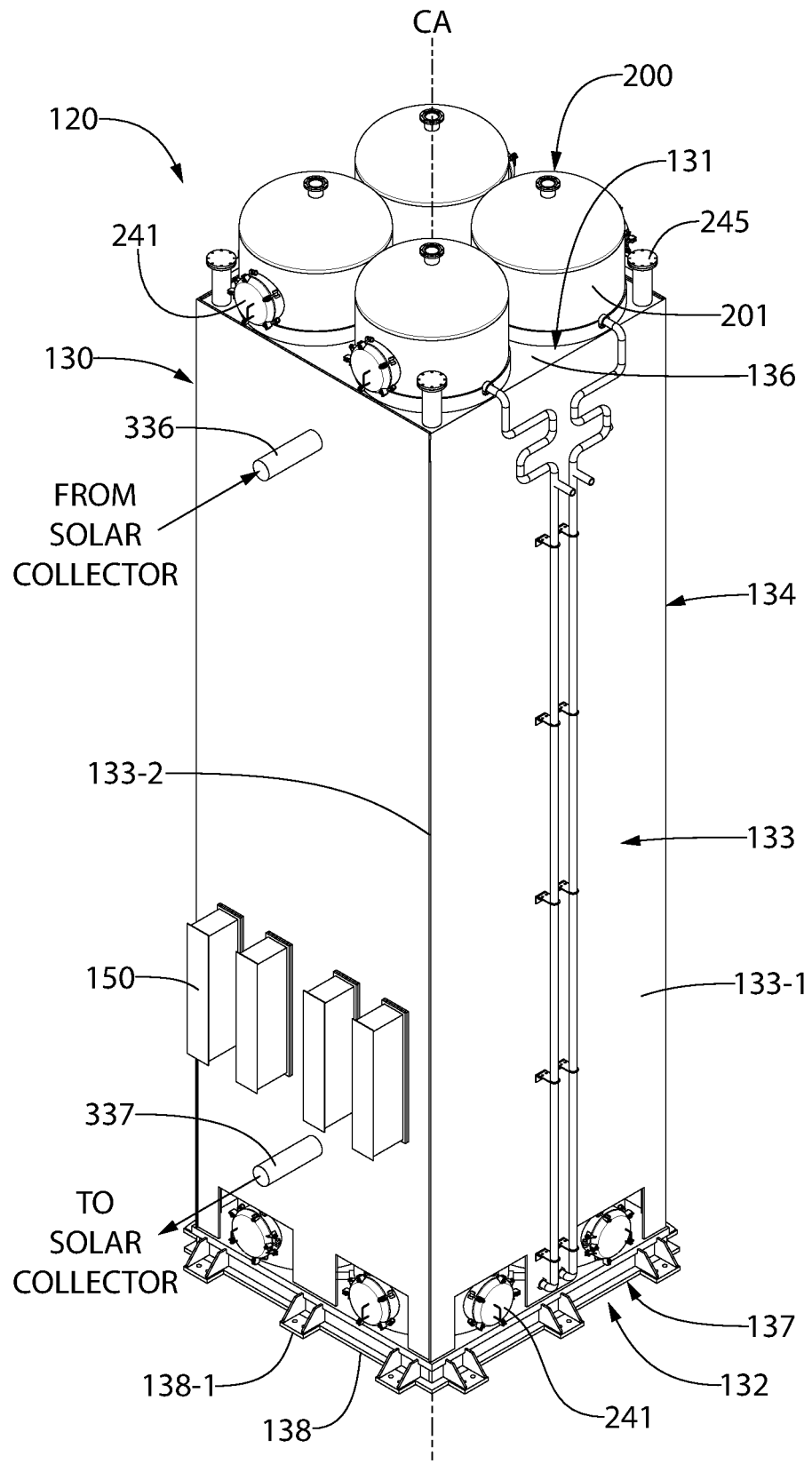
FIG. 5 is a perspective view of a thermal energy storage (TES) vessel of the thermal energy storage system.

Referring to FIGS. 2 and 5, the thermal energy storage system 100 includes green boiler 120 previously described herein which comprises heavily insulated TES vessel 130. Vessel 130 includes and contains first and second pluralities of fluidly isolated heat exchange tubes that form heat exchangers which are integral parts of the vessel. The first plurality of heat exchange tubes 331 are integral fluidic parts of the first closed flow loop 311 associated with the solar energy collection system 310. The second plurality of heat exchange tubes 211 are integral fluid parts of the second closed flow loop 341 associated with the power generation system 340. The heat exchange tubes are further described herein after general discussion of the TES vessel structure.

TES vessel 130 is vertically elongated and oriented structure which may have a generally box-shaped body and construction in one embodiment. For example, TES vessel 130 may have a rectangular cuboid configuration as shown in the non-limiting illustrated embodiment. Other shaped vessels may be used including for example without limitation hexagonal shapes, cylindrical shapes, and others. The shape of the vessel does not limit the concepts or invention disclosed herein.

TES vessel 130 defines a vertical centerline axis CA which passes through the geometric center of the vessel. This axis defines a point of reference to facilitate description of other components of the vessel and relative orientations between components.

The TES vessel generally comprises an outer housing 134 defining a top 131, bottom 132, and plurality of vertical sidewalls 133 extending between the top and bottom along axis CA. The sidewalls may be flat and formed by a plurality of suitable metal side plates 133-1 in one embodiment (e.g., steel or aluminum) attached to an internal structural steel skeletal framework (not shown for clarity to depict the working internal components of the vessel). Four sidewalls 133 are provided, which are each oriented perpendicularly to adjacent sidewalls that meet at 90 degree corners 133-2. The internal structural framework may comprise suitable vertical, horizontal, and angular structural steel members and bracing as needed to support the vessel and its appurtenances.

The TES vessel 130 further comprises a structural support base 138 disposed on the bottom 132 of the vessel housing 134. Mounting base 138 may be a generally horizontal and broadened structure of rectilinear shape which is configured for placement on and securement to a flat support structure such as concrete foundation F slab. In one embodiment, bolting to the slab using a plurality of threaded fasteners or anchors (not shown) which can be inserted through holes provided in gusseted mounting plates 138-1 on all four sides of the base may be used to secure the base to the slab. The mounting base 138 may be formed of a suitably strong horizontal and vertical flat metal plates and structural members of appropriate thickness such as steel welded and/or bolted together to form the mounting base configuration shown in a manner which supports the entire weight of the TES vessel from the foundation slab and anchors the vessel in a stable manner to resist lateral wind loads.

TES vessel 130 further comprises a generally flat horizontal top closure plate 136 at the top 131 and generally flat horizontal bottom closure plate 137 at bottom 132 of the vessel. Plates 136, 137 are formed of a suitable thick metal such as steel or other. The top and bottom closure plates are oriented parallel to each other and oriented perpendicularly to vessel centerline axis CA. Both plates extend completely from side-to-side of the vessel 130 and outer housing 134 as shown. Accordingly, top and bottom closure plates 136, 137 may each have a generally rectilinear (i.e. square or rectangular) shape as opposed to the top and bottom header 201, 203 structures associated with power generation system 340 which are cylindrical, as further described herein. The bottom closure plate 137 is fixedly coupled to and supported by the support base 138 of the vessel previously described above.

The TES vessel 130 (e.g., housing 134) defines an open and continuous/contiguous vertical internal space or cavity 135 extending vertically between the horizontal top closure plate 136 and bottom closure plate 137 along centerline axis CA and laterally/horizontally between the four sidewalls 133 (i.e. side plates 133-1) of the TES vessel housing 134. Cavity 135 therefore extends for at least a majority, and substantially the entire height of the vessel housing 134 in the illustrated embodiment (excluding the thickness of the top and bottom closure plates of the housing).

Internal cavity 135 of TES vessel 130 is filled with the thermal mass composition M (further described herein) which is formulated and operable to absorb and retain heat from the heaters embedded in the material. The thermal mass composition is contained in a "captive" state within the vessel 130 such that the material does not flow into or out of TES vessel 130 during operation of the green boiler 120. Only the heat transfer fluid on the tube-side (i.e. first and second working fluids) flows through the vessel, as further described herein.

The second plurality of heat exchange tubes 211 associated with power generation system 340 which extend through thermal mass composition M within the internal cavity 135 of TES vessel 130 will first be described. Tubes 211 receive the second working fluid which may be water in a liquid state at bottom and leaves the tubes in a vaporous state as steam at the top. According, the water changes phase as it is heated by the thermal mass composition and rises in the tubes.

In one non-limiting embodiment, heat exchange tubes 211 may be organized into several discrete heat exchangers 200 of TES vessel 130 which are integrated directly into the housing 134 of the vessel to form a singular green boiler unit. Advantageously, this provides a modular boiler unit which has a small footprint at the installation site and facilitates shipping/transport as a single unit that can be shop fabricated including all coupled (e.g., welded, flanged/ bolted, threaded, etc.) internal piping and tubing connections. This enhances reliability and decreases installation time at the install site. The singular unit construction of the green boiler 120 is therefore distinct from physically separate and discrete thermal storage vessels and heat exchangers which must be assembled and piped together on-site in the field.

Referring to FIGS. 2 and 5-9, in one embodiment one heat exchanger 200 may be disposed in each of four quadrants of the thermal energy storage vessel (viewed from the top) forming four fluid heating zones of heating the water to steam. Each heating zone is independently operable of the other for heating and boiling the second working fluid (i.e. water) since the heat exchangers 200 may be fluidly isolatable from each other inside the TES vessel 130 forming discrete fluid heating passageways, as further described herein. This advantageously provides considerable operational flexibility since only some of the heat exchangers may be needed at various times to supply enough steam to power the steam turbine 102 and generate electricity to meet the power demands of the electric grid.

Each of the second working fluid heat exchangers 200 generally comprises a top channel or header 201 including a top tubesheet 202, and bottom channel or header 203 including a bottom tubesheet 204. Top header 201 is disposed at the top 131 of TES vessel 130 and bottom header 203 is disposed at the bottom 132 of the vessel. Each tubesheet 202, 204 may have a circular shape in one embodiment.

Each heat exchanger 200 further comprises a tube bundle 210 including a plurality of elongated heat exchanger tubes 211 extending vertically between the top and bottom tubesheets 202, 204. Tubes 211 may be linear and straight tube in one embodiment as shown. The tubesheets are relatively thick structures, such as for example about 4 inches thick in one embodiment. The top ends of the tubes are fixedly and sealably coupled to the top sheet 202 via circumferential seal welds. It bears noting that the tubes 211 pass through complementary configured holes in the top plate 136 but are not fixedly attached thereto and slideable relative to the top plate.

Figure 8:
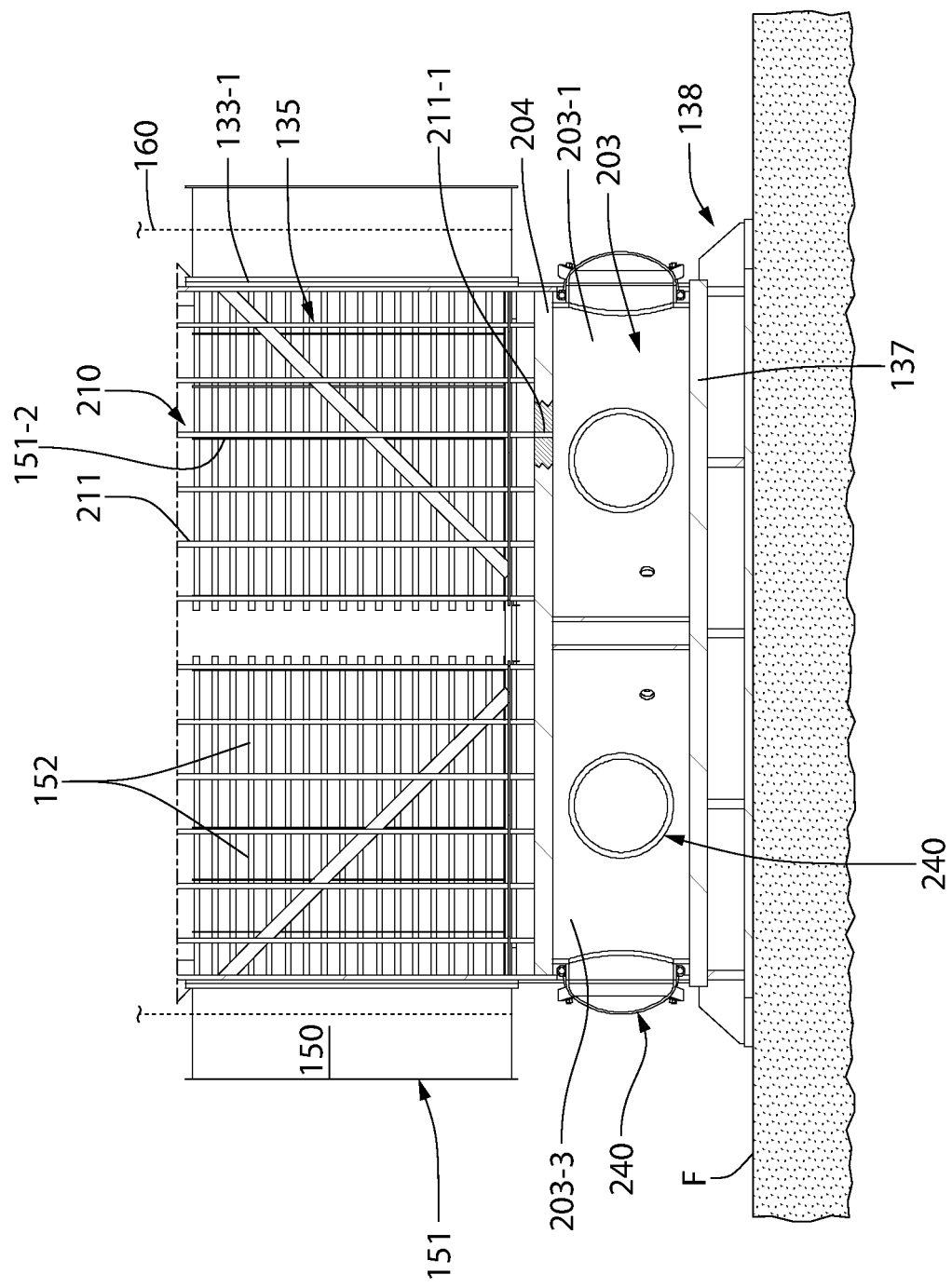
FIG. 8 is an enlarged detail taken from FIG. 6 of the lower portion of the TES vessel.
Figure 9:
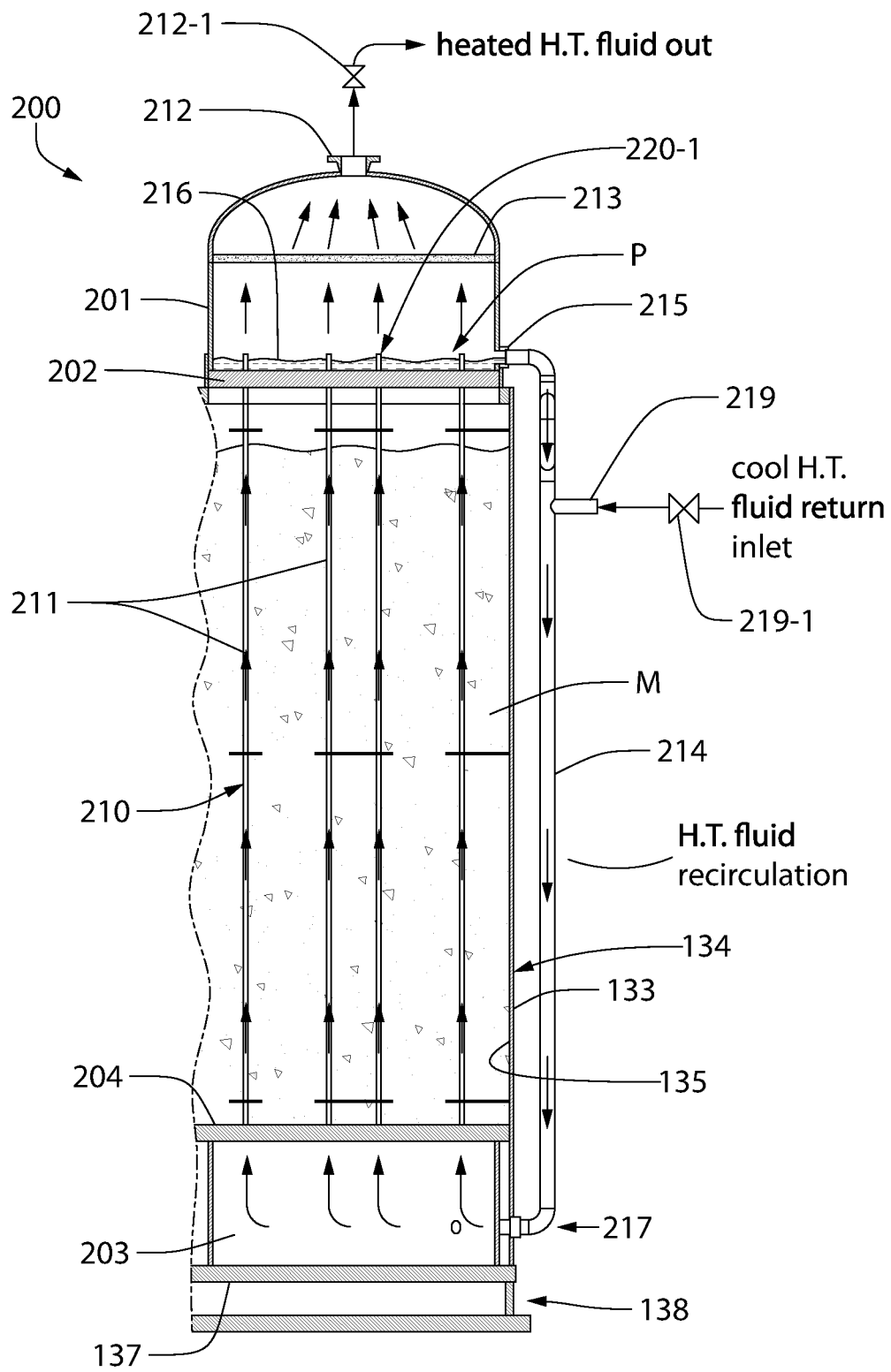
FIG. 9 is a schematic flow diagram showing one heat exchanger of the TES vessel to illustrate the circulation pattern of the heat transfer fluid of the power generation system therethrough.

In a similar vane to the top tubesheet 202, the bottom ends of the tubes 211 are fixedly and sealably seal welded to the bottom tubesheet 204 in the same manner. The tubes 211 extend completely through the top and bottom tubesheets in complementary configured through holes 211-1 (see, e.g., FIG. 8 showing the bottom tubesheet to tube interface). A similar construction with through holes is used for the top ends of tubes and top tubesheet 202. This places each heat exchanger tube 211 in fluid communication with both the top and bottom headers 201, 203 to allow flow of the heat transfer fluid to be exchanged therebetween (see, e.g., FIG. 9 showing the tube-side second working fluid circulation pattern flow through TES vessel 130 denoted by flow arrows).

The top header 201 defines an open internal space which forms a top flow plenum 201-1 of the heat exchanger. Bottom header 203 similarly defines an open internal space which defines a bottom flow plenum 203-1. The second working fluid (e.g., water or other) flows inside the tubes 211 of the tube bundle 210 on the tube-side of the tubes. Bottom flow plenum 203-1 receives the second working fluid in a cooled liquid state and distributes the fluid to the inlet bottom ends of each tube 211 in the tube bundle 210. In a similar fashion, top flow plenum 201-1 receives and collects the second working fluid from outlet top end each tube 211 after it has been heated by the thermal mass composition M inside the TES vessel 130 and converted to steam from a liquid phase entering the vessel. Accordingly, as shown in the flow diagram of FIG. 9, the flow of the heat transfer fluid inside the tubes 211 in the present embodiment is vertically upward in the vessel from the bottom header 203 to the top header 201.

The heat exchanger tubes 211 are embedded in the thermal mass composition M which fills the gaps or voids between the tubes of the tube bundle 210 such that the thermal mass composition is in direct conformal contact with the outer surface of the tubes for optimum heat transfer. Thermal mass composition M will be further described herein.

In one non-limiting embodiment, both top and bottom headers 201, 203 may comprise a generally tubular-shaped and hollow cylindrical metal body in structure formed by a respective vertically oriented annular shell 201-3, 203-3. The shells define circumferentially-extending vertical sides of the headers as shown. Shell 203-3 of the bottom header 203 extends vertically and is welded and sandwiched between bottom tubesheet 204 at top and bottom closure plate 137 of the TES vessel housing 134 at bottom. Accordingly, the top and bottom ends of shell 203-3 are seal welded to the bottom tubesheet and bottom closure plate respectively of the housing to form a leak-tight bottom flow plenum 203-1 inside bottom header 203. This fixes the bottom tubesheet 204 in position in the vessel.

Shell 201-3 of top header 201 protrudes upwards from top closure plate 136 of the TES vessel housing. A domed head 201-2 is seal welded to the top end of shell 201-3 to form a leak-tight top flow plenum 201-1 inside top header 201. In some implementations, the head may be an elliptical or hemispherical head; however, other domed structures may be used. A fluid outlet 212 in the form of a protruding short piping section is disposed on the domed head of each top header for discharging the heated second working fluid (e.g., water in steam form) from the top header. Steam flow out of TES vessel 130 is controlled by fluid outlet valve 212-1 (see, e.g., FIG. 22). Fluid outlet 212 in one embodiment may be centered at the top of the head to collect the heat transfer fluid in liquid or steam phase exiting TES vessel 130 after being heated. The fluid outlets from each heat exchanger 200 may be fluidly coupled together to form a single steam fluid stream (shown schematically in FIG. 2) which exits the vessel and enters the second closed flow loop 341 of the power generation system 340.

Figure 7:
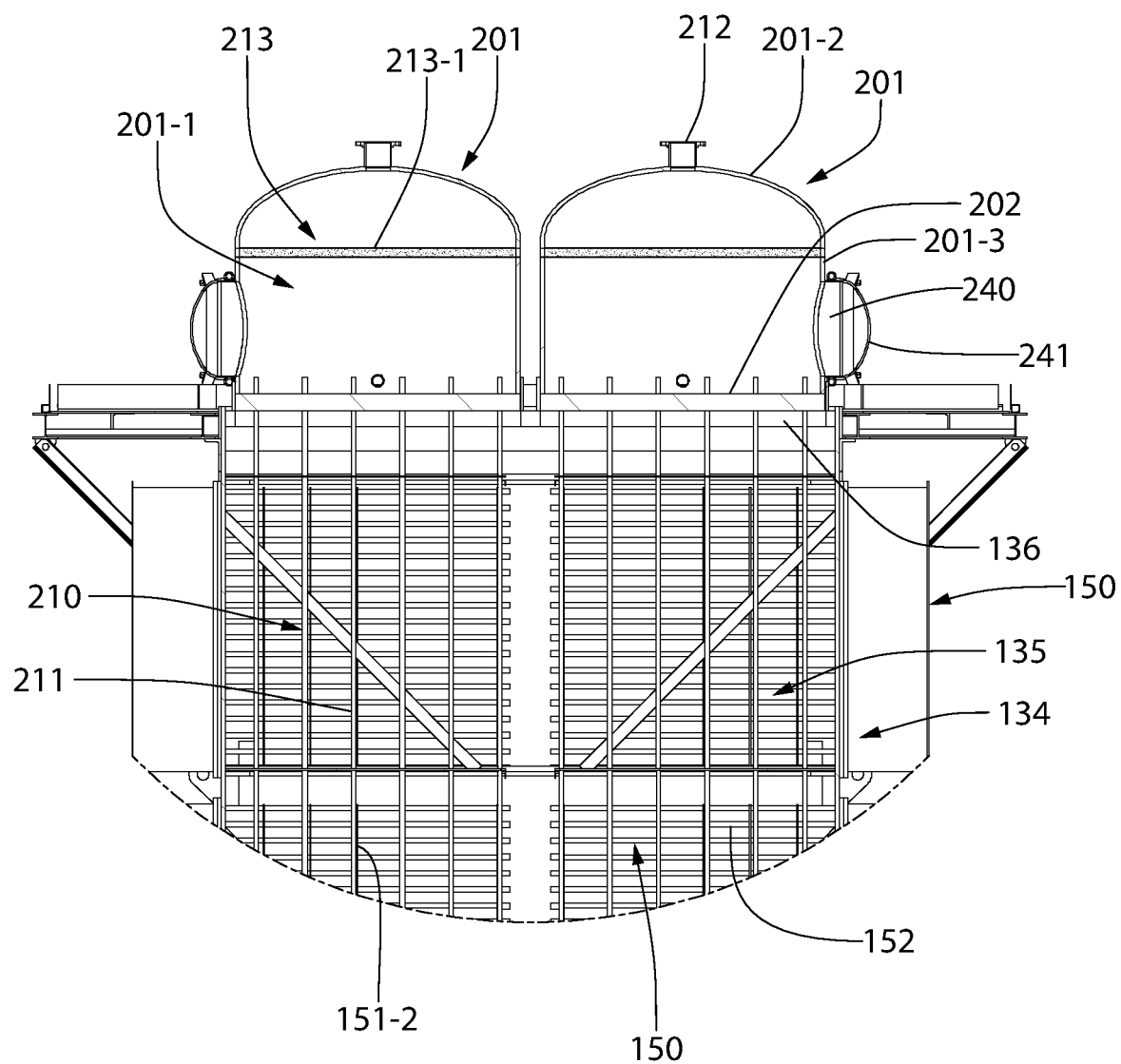
FIG. 7 is an enlarged detail taken from FIG. 6 of the upper portion of the TES vessel.

According to another aspect of the invention, the TES vessel 130 which converts water into steam on the tube-side of the heat exchanger tubes 211 of tube bundle 210 may include a demister 213. FIG. 7 is an enlarged cross-sectional view of the top header 201 and demister 213. The demister serves to condition and dry the steam before exiting the top header 201 through fluid outlet 212, thereby increasing "steam quality" (proportion of saturated steam present in a saturated liquid/steam (vapor) mixture). Higher quality steam typically provides greater heat transfer efficiency, and is therefore desirable.

In one embodiment, demister 213 may be formed by an expanded metal mesh panel 213-1 comprising plural openings between the mesh wire through which the steam can pass and flow. The collected carryover water droplets entrained in the steam condenses on the metal mesh and falls by gravity from the demister downwards onto the top tubesheet 202 inside the top header 201/flow plenum 201-1 (see, e.g., FIG. 9). The collected water (e.g., condensate) is drained away and out from the top header by a vertical downcomer 214 fluidly coupled to top header 201 such as via a drain outlet 215 coupled to the shell 201-3 of the header as shown. The downcomer may be formed by a pipe in one non-limiting embodiment which may be located outside housing 134 of the TES vessel adjacent to the sidewalls 133 of the housing. The bottom end of each downcomer 214 is fluidly coupled to the bottom header 203/flow plenum 203-1 via a header fluid inlet 217 to return the drainage thereto. The fluid inlet may be formed by a short section of piping. Accordingly, a flow circulation loop is formed by the downcomer 214 between the top and bottom headers 201, 203 and the tube bundle 110 as shown in FIG. 9. In the flow circulation loop, a portion of the heated heat transfer fluid existing the top ends of the tubes in the top header 201 is recirculated through downcomer 214 back to the bottom header 203, as further described herein. Drain outlet 215 on top header 201 at top of the downcomer 214, which may also be formed from a short section of piping, is located at an elevation proximate to the top surface of the top tubesheet 202 for reasons which will become evident immediately below.

It bears noting that the collected condensate water inside the header 201 will pond forming a shallow condensate pool P with a defined surface level 216 (see, e.g., FIG. 22). To prevent remixing and rewetting the steam exiting the heat exchanger tubes 211 into top header 201 with the ponded/pooled water therein, each heat exchange tube 211 may protrude upwards from top tubesheet 202 (or have a tube extension) by a sufficient length (e.g., height) having an open top end 220-1 located at an elevation above the surface level 216 of the condensate pool P. Establishing the height of the extension tubes may take into account any anticipated fluctuation of the surface level 216 of the condensate pool P in the top header. Extension tubes 220 are each welded at their bottom ends to the top surface of top tubesheet 202 around each heat exchanger tube 211 and protrude vertically upwards therefrom for a distance. A circumferential seal weld is formed at the top surface of tubesheet 202 around the top end of each heat exchanger tube 211 and its respective extension tube 220 such that the tube is in direct fluid communication therewith. The drain outlet 215 of the top header 201 is located in elevation at a point where the pooled water will exit the outlet before being able to enter the top end of the discharge tube and mix with the upward and outward flowing steam. Top ends 220-1 of the extension tubes 220 therefore have an elevation greater than the surface level 216 of the condensate pool P, which is set and fixed by the elevation of the top header drain outlet 215 as noted above.

In one embodiment, the drainage of the second working fluid (e.g., condensate water) from the top headers 201 of each heat exchanger 200 through their respective downcomers 214 to the bottom headers 203 creates a natural passive convective thermo-siphon circulation flow loop resulting from heating the heat transfer fluid within the heat exchanger tubes 211 inside the TES vessel 130 (see, e.g., second working fluid flow arrows FIG. 9). This creates natural gravity and heating induced fluid circulation on the tube-side between the top and bottom headers 201, 203 and through the tube bundle 210 of each heat exchanger 200 which is not powered by mechanical pumps. A fluid which is heated becomes less dense and rises which powers the circulation flow. The thermo-siphon effect principle is well understood by those skilled in the art without further undue elaboration.

The flow of second working fluid through the TES vessel 130 and tube bundles 210 of the second closed flow loop 341 may be in a vertically upward direction and straight path as shown in FIG. 9 in one embodiment which is formed by straight heat transfer tubes 211. This arrangement takes advantage of the natural thermo-siphon effect and gravity to drive the recirculation flow of condensate through the downcomers 214 between the top and bottom flow plenums of the heat exchangers 200 as described above. The rising second working fluid (e.g., water) is heated in tubes 211 of the tube bundle 210 and passively draws incoming condensate from the downcomers into fluid inlet 217 and the bottom header 203 without the need for or use of pumps.

In lieu of external downcomer 214, in some embodiments the downcomers may be defined by some of the heat exchanger tubes 211 inside TES vessel 130 which may be located in cooler regions of the vessel.

After the second working fluid heated by thermal mass composition M in TES vessel 130 leaves the TES vessel 130 as steam via the fluid outlets 212 of each heat exchanger 200 and yields it heat energy for power generation via the turbine-generator set, the cooled heat transfer fluid is pumped back to the TES vessel via the second closed flow loop 341 previously described herein (see, e.g., FIGS. 2 and 9). The returning cool or cooled fluid in the closed flow loop 341 (i.e. feedwater) may be piped directly into each downcomer 214 of the four heat exchangers 200 via a return fluid inlet 219 fluidly connected to each downcomer see, e.g., FIG. 9). The second working fluid flow into TES vessel 130 is controlled by fluid inlet valve 219-1 (see, e.g., FIG. 9). The returning cooler heat transfer fluid from closed flow loop 110 mixes with the heated condensate circulation flowing downwards in the downcomers from the top headers 201 of each heat exchanger 200 and then enters the bottom headers 203 via the fluid inlet 217 connections. A single fluid stream comprising the condensate recirculation flow and feedwater flow enters the bottom headers 204 thereby requiring only a single fluid inlet 217 connection on each bottom header. In addition, a blended heat transfer fluid temperature results upstream of the bottom headers which ensures that heat transfer fluid of uniform temperature enters the bottom headers to eliminate any fluid temperature variations in different portions of the bottom flow plenum 203-1 within these headers. Alternatively in other possible embodiments, however, a separate and discrete return fluid inlet 219 may be fluidly connected directly to each heat exchanger bottom header 204 which is distinct from and in addition to the downcomer piping return fluid inlet connections (i.e. fluid inlet 217 connections) formed on the bottom headers. Either fluid return arrangement is possible.

Each of the four heat exchangers 200 shown in the non-limiting illustrated embodiment are fluidly isolated from each other on the tube-side which conveys the heat transfer fluid through the thermal mass composition M inside TES vessel 130. Advantageously, this allows one heat exchanger to be taken out of service for maintenance/repair (e.g., plugging tubes) while the remaining heat exchangers continue to be fully functional, thereby allowing TES vessel 130 to continue operation. In addition, for operational flexibility which is significant, the heat transfer fluid demand (whether heated liquid or steam) may not require operation of all four heat exchangers 200 all the time. Accordingly, each heat exchanger 200 and associated discharge and inlet piping network is advantageously configured to be fluidly isolatable from all other heat exchangers so that each heat exchanger can operate independently of the others.

Returning back now to the heat exchangers 200 and general reference to FIGS. 2 and 5-9 as applicable, the tube bundles 210 of each heat exchanger which define the active heat transfer region of each heat exchanger may be arranged in a straight once-through flow pattern on the tube-side through the thermal mass composition M which is a stationary or "captive" mass that does not flow into or out of TES vessel 130 (see particularly FIG. 9 flow schematic). The heated heat transfer fluid (e.g., second working fluid comprising water in steam phase) discharged by each heat exchanger may be fluidly coupled and piped together after leaving each heat exchanger top header 201 to form a single stream of steam for power generation or alternatively other uses such as district steam heating or industrial purposes.

It bears noting that the thermal mass composition M is a non-flowing and stationary/captive mass inside TES vessel 130 which is not pressurized since internal cavity 135 of the TES vessel is at atmospheric pressure. The tubes 211 of the tube bundles 210 therefore form the pressure boundary of the heat transfer fluid flowing therein which is put under pressure from being heated by the thermal mass composition.

To provide access to the top and bottom headers 201, 203 of each heat exchanger 200, at least one manway 240 is provided for each header. The manway comprises an openable/closeable hatch 241 hingedly coupled to the vertical shells of the headers 201, 203. The hatches are configured to fluidly seal the access openings to the headers via inclusion of appropriate gasketing material. Because it is not uncommon for heat exchanger tubes to develop cracks and leak over time due to temperature and pressure cycling, manway 240 allows workers to readily access the top or bottom tubesheets 202, 204 for maintenance such as plugging any leaking tubes at the tubesheets and/or for routine inspection of the tubesheets for tube ligament cracking.

TES vessel 130 further comprise a plurality of fill ports 245 at top extending through top closure plate 136. The fill ports allow thermal mass composition M to be added to internal cavity 135 of the vessel. In one embodiment, four fill ports may be provided; one each being located in each top corner of the vessel see, e.g., FIG. 5). Each fill port may comprise aa short section of capped piping as shown which is in fluid communication with internal cavity 135 of the vessel 130.

It bears particular note that internal cavity 135 of the TES vessel 130 defines a common space or volume shared by the tube bundles 210 of all heat exchangers 200. The outer surfaces of the heat transfer tubes 211 of each heat exchanger are therefore in direct physical and conformal contact with the same undivided/unsegregated bed of thermal mass composition M in the cavity 135. Advantageously, this ensures uniform heating of the heat transfer fluid flowing through the tube-side of each heat exchanger 200 by a single thermal mass. Accordingly, there are no physical partitions or dividers which sub-divide the vessel internal cavity 135, thereby which further reduces fabrication costs. By contrast, the tube-sides of the heat exchangers are fluidly isolated from each other as described elsewhere herein.

The components of the heat exchangers 200 including the top and bottom headers 202, 204 and tubes 211 have a fully metallic construction. These components are preferably formed of steel, and more preferably a suitable corrosion resistant metal such as stainless steel for at least the wetted parts thereof. Other types of tubing materials however may be used. The appropriate type of tube material can be selected for compatibility and use with the particular type of thermal mass composition M used so as to not be corrosively affected by the chemistry of at least the phase change constituent of the material. Other metallic materials may be used for the heat exchangers components as appropriate for the particular application.

The first plurality of heat exchange tubes 331 associated with solar energy collection system 310 which extend through thermal mass composition M within the internal cavity 135 of TES vessel 130 will next be described. Tubes 331 receive the heated first working fluid from solar collector 312, which may be molten salt or heat transfer oil in some embodiments. The tubes 331 may be interspersed between heat exchange tubes 211 associated with the second closed flow loop 341 of the power generation system 340 previously described herein. Tubes 331 preferably may be uniformly distributed throughout the thermal mass composition to evenly heat the composition material to greatest extent practical.

Heat exchange tubes 331 are fluidly coupled to at least one fluid inlet 336 and at least one fluid outlet 337 which are externally accessible on the exterior of TES vessel 130 as shown in FIG. 5 for fluid coupling to the rest of first closed flow loop 311. Fluid inlet 336 is part of the "hot" leg of the first closed flow loop which conveys the heated first working fluid to vessel 130. Fluid outlet 337 is part of the "cold" leg of the first closed flow loop which receives cooled first working fluid from the vessel after yielding its heat to thermal mass composition M and conveys the cooled fluid back to solar collector 312 for reheating. The inlet and outlet 336, 337 may be formed by short stub sections of pipe in one embodiment. The inlet and outlet 336, 337 may be located on and extend through the sidewalls 133 of TES vessel 130 in one embodiment as shown, or alternatively may be located on and extend through the top and bottom closure plates 136, 137, or may be located on and extend through a combination of the sidewalls and top and bottom plate depending on the internal routing and arrangement of the heat exchange tubes 311 through the vessel interior.

In one embodiment, heat exchange tubes 331 may be vertically oriented in TES vessel 130 and fluidly coupled to a top inlet header 335a and bottom outlet header 335b best shown schematically in FIG. 10. The headers may be internal as shown or externally located with respect to the outer housing of the TES vessel. In the illustrated embodiment, tubes 331 are straight tubes. In other embodiments, tubes 331 may be horizontally oriented and either straight or arranged in a U-shaped tube bundles whose design is well known in the art without further elaboration here. Accordingly, any suitable arrangement and orientation of heat exchange tubes 331 inside TES vessel 130 is possible so long as the thermal mass composition M may be uniformly heated and interference with the heat exchange tubes 211 of the second closed flow loop 341 which convey the second working fluid is avoided.

Heat exchange tubes 331 which form integral fluidic parts of the first closed flow loop 311 may be formed of any suitable metallic material designed for the expected service conditions associated with the first working fluid (e.g., molten salt or heat transfer oil). Stainless steel may be used in some embodiments.

The TES vessel 130 in some embodiment may optionally be equipped with supplementary heat input capability in the form of electric immersion heaters 150 that can extract electric power from the grid to heat the thermal mass composition M preferably when the power is cheap, such as during off-peak load demand operating periods of the electric power grid. However, if supplemental heat is needed to heat the thermal mass composition to operating temperatures at other times, the heaters could be energized during peak or normal operating periods of the electric power grid in order for the solar power generation system to continue generating power.

Figure 6:
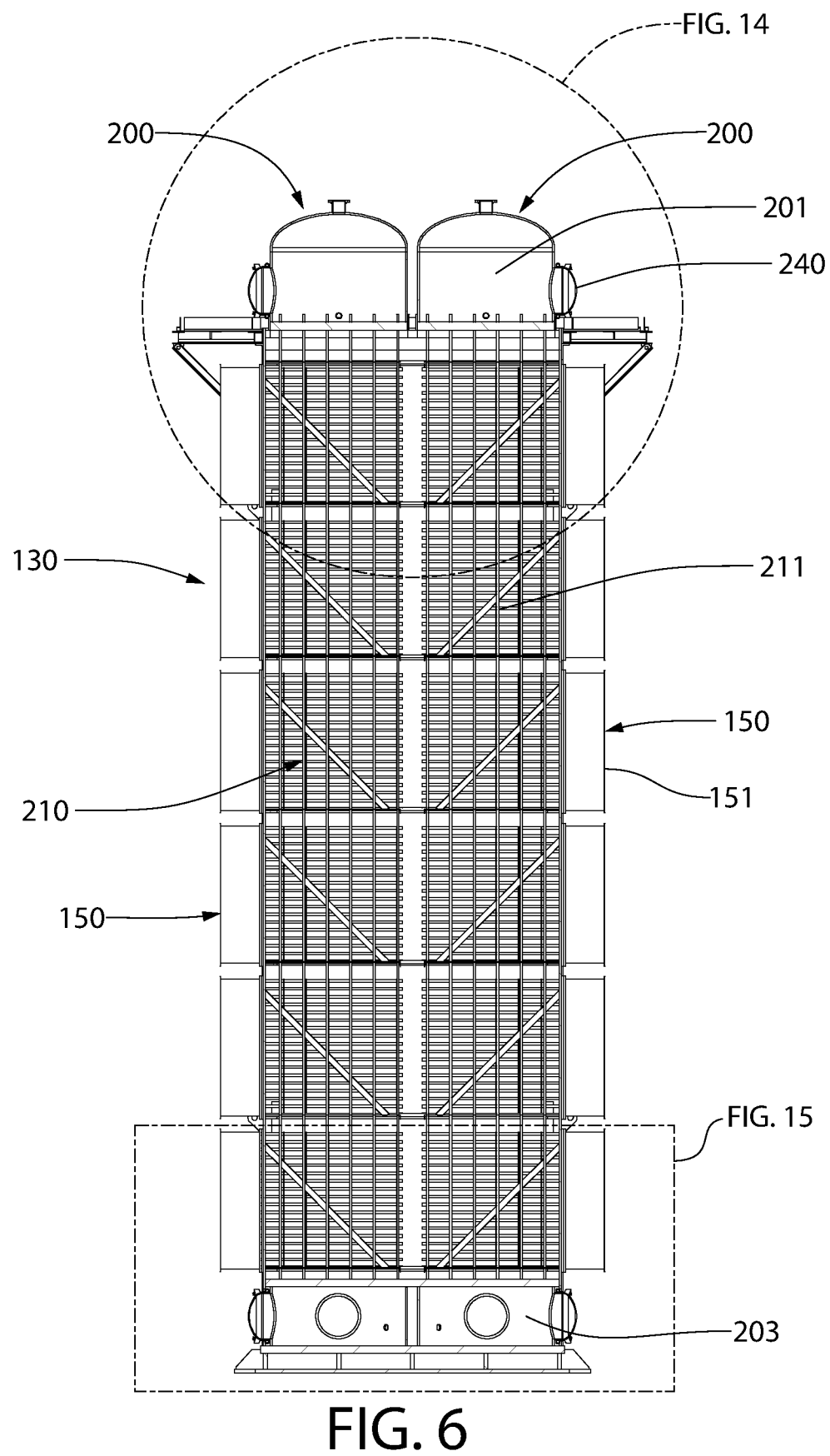
FIG. 6 is a side cross-sectional view thereof.

Alternatively, the electric power source for the electric immersion heaters 150 may be a wind farm comprising one or more wind turbine-generators 480 which are electrically coupled to the heaters (see, e.g., FIG. 2). In various embodiments, the wind turbine-generator units may be used in combination with the solar collector 312 described herein, or instead of the solar collector. The wind power options are advantageous for siting the hybrid power generation system in locations which may not receive sufficient solar radiation to fully charge (i.e. heat) the thermal mass composition M in TES vessel 130 (green boiler) to a sufficient degree to increase the enthalpy of the second working fluid (be it steam for a Rankine cycle or gas for a Brayton cycle) for operating the turbine-generator set of the power generation system 340. Referring to FIGS. 5 and 6, an array of electric immersion heaters 150 may be embedded in the thermal mass composition M held inside internal cavity 135 of the vessel. The heaters are configured for electrical coupling to an available source of electricity such as via any suitable commercially-available electric contacts or connectors necessary for the intended application. The electric power source may be the regional electric power grid controlled by public utilities, and/or an on-site local power source such as that at an electric power generation plant which may utilize renewable energy sources (solar, wind, biomass, etc.) or nuclear power to generate electricity. The heaters 150 convert electric power received from the electric power source (whatever its nature) to thermal energy which is used to heat the thermal mass composition.

In one embodiment, the heaters 150 may each have a modular construction comprising a panel or box-shaped heater housing 151 and plurality of horizontally elongated heating elements 152 mounted to the housing (see also FIGS. 7 and 8). Housing 151 is configured to support the heating elements and forms a self-supporting heater which may be handled and installed/removed as a single unit. In one embodiment, housing 151 may include a plurality of horizontally spaced apart vertical heating element support plates 151-2 with holes formed in each plate to receive and support the horizontally-extending elongated elements. Housing 151 may have a rectangular cuboid configuration in one embodiment as shown; however, other shaped polygonal or non-polygonal (e.g., cylindrical) heater housings may be provided. Heating elements 170 may be horizontally oriented and rod-shaped. The elements are each in direct physical contact with the thermal mass composition M internal cavity 135 of TES vessel 130. The heating elements may have a cylindrical configuration in one non-limiting embodiment.

Heaters 150 are removably and slideably insertable in a horizontal direction into TES vessel internal cavity 135 between the vertical heat exchanger tubes 211 of the tube bundles 210 of each heat exchanger 200. In one non-limiting arrangement, banks of heaters 150 may be provided on two opposing sidewalls 133 of TES vessel 130. The units 150 are vertically and horizontally spaced apart from each other on each sidewall as shown. A sufficient number of heaters 150 are provided which are located over a majority and preferably substantially along the entire height of TES vessel internal cavity 135 and the bed of thermal mass composition M contained therein to evenly heat the bed of material from top to bottom. FIG. 2 shows only a single cluster or group of heaters 150 at one elevation of the TES vessel 130 for brevity; however, the heaters in implementation may extend along the height of the vessel with groups of heater at multiple elevations as shown in FIG. 6. In one implementation, each heater 150 may have a horizontal width which extends for greater than 40% the width of the TES vessel housing 134 measured between the opposing sidewalls 133. Accordingly, each heater 150 has a width slightly less than half the width of the vessel housing, and preferably no less than the horizontal/lateral extent of each heat exchanger tube bundle 210 to ensure the thermal mass composition adjacent each heat exchanger tube 211 of the bundle is adequately heated by the heating elements 152 of the heaters (see, e.g., FIG. 25).

As shown, pairs of heaters 150 may be arranged in opposing end-to-end relationship at each elevation of the vessel 130 where heaters are located; each unit entering from one of the two opposing vessel sidewalls 133. Any suitable number of heaters 150 may be provided to sufficiently heat thermal mass composition M to its desired max temperature, which in turn determines the max temperature to which the second working fluid of the power generation system 340 can be heated flowing through the heat exchanger tubes 211 embedded in the thermal mass.

The heaters 150 may be detachably coupled to the side plates 133-1 of the opposing TES vessel sidewalls by any suitable fastening means including for example without limitation welding, threaded fasteners, or other methods. Complementary configured mounting holes may be provided in TES vessel housing 134 (i.e. side plates 133-1 of sidewalls 133) to allow the elongated heating elements 152 of heaters 150 to slide into and enter internal cavity 135 of the vessel for embedment into the thermal mass composition. The thermal mass composition M may be added to the vessel internal cavity after heaters 150 are installed at each elevation from the bottom to the top of the vessel in stages. Other manners of installing the heaters and thermal mass composition may be used. A relatively tight interface may preferably be provided between the vessel housing mounting holes 153 and outermost exposed portions of the heater housings 151 which protrude laterally/horizontally outward from the sidewalls 133 of TES vessel 130.

When the heaters are installed in the thermal energy storage vessel 130, the thermal mass composition M comprised of generally granular solid particles when unheated fills the voids between the heating elements 152 and the heat exchanger tubes 211 before the elements are energized. When the heating elements are energized, the heretofore granular solid phase change material (PCM) particles melt and are converted to a flowable liquid or molten state which fills the interstitial spaces between the non-melting constituents of the thermal mass composition (i.e. metallic material as further described herein). The thermal mass composition is in direct conformal contact with the heating elements 152 and tubes 211 for maximum heat transfer to the heat transfer fluid flowing inside the tubes 211 of the heat exchangers 200.

To retain the heat of the thermal mass composition M inside TES vessel 130, the housing 134 is heavily insulated. FIG. 8 shows the TES vessel in an insulated state comprising an outer layer of insulation 160 represented schematically by dashed lines wrapped around the sidewalls 133 of the vessel. Other portions of the vessel and equipment may be insulated and if necessary heat-traced as needed (e.g., exposed portions of the top plate, etc.).

Thermal mass composition M will now be further described.

Any suitable thermal mass composition M may be used which can be customized and selected for the required thermal duty and operating parameters needed for heating the heat transfer fluid (which may be water/water mixtures or other fluids) from an inlet temperature entering the TES (thermal energy storage) vessel 130 to a desired outlet temperature. In one preferred embodiment, without limitation, the thermal mass composition may be a mixture comprising at least one first base metallic material mixed with a second phase change material (PCM). Both the base metallic material(s) and PCM of the thermal mass composition mixture may be in a granular particle form (i.e. a solid) at ambient temperatures which is flowable to fill internal cavity 135 of the TES vessel via openable/closeable fill ports 245 (see, e.g., FIG. 5) through the vessel housing 134. Both the base metallic material(s) and PCM are materials having properties configured to produce a thermal mass operable to absorb and store heat, and release that heat on demand when required to heat the heat transfer fluid flowing through tubes 211 of the tube bundles 210 in each heat exchanger 200.

Preferably, the at least one base metallic material may constitute a majority of the mixture or composition and has a higher melting point or temperature $T_{bm}$ than the melting point or temperature $T_{pcm}$ of the PCM. Temperature $T_{pcm}$ is preferably lower than the normal operating temperature $T_{nm}$ of the thermal mass composition M to which the mass will be heated for normal operation (via the heat or thermal energy supplied by heaters 150) such that the PCM melts and changes to a liquid or molten state when the thermal mass is heated. At ambient temperatures, the PCM is in a solid particle state.

By contrast, the at least one base metallic material preferably has a melting temperature $T_{bm}$ greater than the normal operating temperature $T_{mm}$, and preferably greater than the maximum temperature $T_{max}$ of the thermal mass composition when heated by the heaters such that the base metallic material always remains in a solid particle state whether the heaters are fully energized or offline. In some representative but non-limiting examples, the base metallic material may have a melting temperature $T_{bm}$ greater than 1,000 degrees C. (Celsius), or greater than 2,000 degrees C. in some embodiment, whereas the PCM may have a melting temperature $T_{pcm}$ less than 1,000 degrees C. The metallic material may comprise a single one or a combination of ferrous and/or non-ferrous metal particles selected to optimize heat retention capabilities and meeting the foregoing melting temperature criteria.

In use to store thermal energy, the TES vessel 130 (i.e. internal cavity 135) is first filled with the thermal mass composition M to a final elevation or level that at least covers the highest or uppermost heaters 150 in the vessel. Both the at least one base metallic material and PCM are in a solid granular particle state at ambient temperatures before the thermal mass is heated by electric heaters 150. The initially "off" heaters 150 are then energized, which heats the entire bed of thermal mass composition M to its normal operating temperature $T_{nm}$ (which may be less than its maximum temperature $T_{max}$ in some cases). While the at least one base metallic material remains in solid granular particle form, the PCM will melt thereby flowing and filling the interstitial spaces/voids between the base metallic material particles. This advantageously results in more efficient and complete heating of the thermal mass composition M than if all metallic material were used because air-filled pockets or voids between the material particles is filled with a conductive liquid PCM, thereby increasing the heat retention properties of the thermal mass. Thought of another way, this might be considered somewhat analogous to wetted sand in which water fills voids between the sand particles. The melted PCM in combination with the still solid base metallic material particles further allows the thermal mass composition mixture to enhance conformal contact with both the heating elements 152 of heaters 150 and the outer surfaces of the heat transfer tubes 211 of each heat exchanger 200 which further benefits heat transfer. When the heat input is removed from the thermal mass composition by de-energizing the heaters 150, the PCM will return to a solid state.

In preferred but non-limiting embodiments, the PCM used may be a salt which may be converted from a granular solid particle state at ambient temperatures to a liquid/molten state when heated by electric immersion heaters 150 when energized by electric power extracted from an available power source such as the electric power grid or another source. Any suitable salt may be used which is selected for the required thermal duty.

Some examples of salts which may be used to form the PCM bed B in each thermal energy storage vessel 121 are shown in the following table:

| $T_{melt}$ (° C.) | Material | Latent Heat (kJ/kg) |
|---|---|---|
| 94 | 60 wt % $AlCl_3$ + 14% KCl + 26% NaCl | 213 |
| 150 | 66 wt % $AlCl_3$ + 34% NaCl | 201 |
| 202 | 7.5 wt % NaCl + 23.9% KCl + 68.6% $ZnCl_2$ | 200 |
| 258 | 59 wt % NaOH + 41% $NaNO_3$ | 292 |
| 307 | $NaNO_3$ | 177 |
| 318 | 77.2 mol % NaOH – 16.2% NaCl – 6.6% $Na_2CO_3$ | 290 |
| 320 | 54.2 mol % LiCl – 6.4% $BaCl_2$ – 39.4% KCl | 170 |
| 335 | $KNO_3$ | 88 |
| 340 | 52 wt % Zn – 48% Mg | 180 |
| 348 | 58 mol % LiCl – 42% KCl | 170 |
| 370 | 26.8% NaCl – 73.2% NaOH | 320 |
| 380 | KOH | 149.7 |
| 380 | 45.4 mol % $MgCl_2$ – 21.6% KCl – 33% NaCl | 284 |
| 381 | 96 wt % Zn – 4% Al | 138 |
| 397 | 37 wt % $Na_2CO_3$ – 35% $K_2CO_3$ – 31% $Li_2CO_3$ | 275 |
| 430 | 56 wt % NaCl – 44% $MgCl_2$ | 168 |
| 443 | 59 wt % Al – 35% Mg – 6% Zn | 310 |
| 450 | 48 wt % NaCl – 52% $MgCl_2$ | 430 |
| 470 | 36 wt % KCl – 64% $MgCl_2$ | 388 |
| 487 | 56 wt % $Na_2CO_3$ – 44% $Li_2CO_3$ | 368 |
| 500 | 33 wt % NaCl – 67% $CaCl_2$ | 281 |
| 550 | LiBr | 203 |
| 632 | 46 wt % LiF – 44% $NaF_2$ – 10% $MgF_2$ | 858 |
| 658 | 44.5 wt % NaCl – 55.5% KCl | 388 |
| 714 | $MgCl_2$ | 452 |
| 801 | NaCl | 510 |

The melt temperatures and latent heat properties of the salt are properties and factors which direct the selection of the type salt for the required thermal duty and temperature increase of the heat transfer fluid. It bears noting that the type of salt used in each thermal energy storage vessel 130 for the Green Boiler 120 may therefore be customized and different. Regardless of the application including simply heating water for district heating or other applications, it is apparent to those skilled in the art that thermal duty and performance of the thermal energy storage vessel 121 is highly customizable to meet the required temperature increase objectives of the thermal energy system.

It bears noting that any suitable PCM may be used other than the salts such as those listed above may be used so long as the melting temperature Tpcm of the PCM is less than the normal operating temperature Tnm (previously described herein) of the thermal mass composition during operation of the TES vessel 130 when the heaters 150 are energized.

Although the thermal energy storage (TES) vessel 130 121 disclosed herein may have been described without limitation for heating and converting water (second working fluid) to steam phase in one embodiment via the thermal mass composition bed to operated the steam turbine, the invention is not limited in this regard. Accordingly, the TES vessel 130 may be used to heat any other types of fluids which are flowable through the heat exchanger tubes 211 of the vessel. Accordingly, numerous applications of the "green" thermal energy storage system 100 are possible and within the scope of the present disclosure.

General operation of the TES vessel 130 to store thermal energy and heat a heat transfer fluid may be summarized as follows with initial reference to FIG. 2. The process or method may begin with heating the thermal mass composition M in the vessel by circulating and flowing the first working fluid from the solar collector 312 through first closed flow loop 311 and the heat exchange tubes 318 embedded in the thermal mass composition. The hot first working fluid (e.g., molten salt or heat transfer oil) heats the thermal mass composition, cools, and flows back to the solar collector for reheating. The solar collector heats the first working fluid back up via incident solar radiation during daylight hours when the sun is shining, as previously described herein.

The second working fluid in a cooled state, which may be boiler feedwater in one preferred embodiment, flows through the second closed flow loop 341 to inlet headers 203 of heat exchangers 200 and then through the heat exchange tubes 211 embedded in the thermal mass composition M. The second working fluid absorbs heat from the composition which raises the temperature of the fluid above the boiling point to convert the water into steam, which is collected in the outlet headers 201. The steam flows in the second closed flow loop to the steam turbine 103 to generate electric power (electricity) via the generator 103 operably coupled to the turbine in a well known manner via electromagnetic induction. The steam enters the turbine at higher pressure than leaving the turbine as thermal energy is converted to electric energy via the steam turbine-generator set. The lower pressure steam is condensed by condenser 106 and is pumped back through the second closed flow loop 341 to the TES vessel 130 to repeat the process.

In the event the thermal mass composition M is depleted of sufficient thermal energy to heat the second working fluid associated with power generation system 340 to the desired steam operating conditions necessary to generate electric power (e.g., steam pressure and temperature), the auxiliary electric immersion heaters 150 may be used as back up. This scenario may occur when electric power generation is needed at night after sunset when solar energy is not available to recharge the bed of thermal mass composition M. This is a very real scenario particularly in hot locations like the desert climate states of the southwest United States where summer temperatures can remain at or above 100 degrees F. after sunset, by continuing the high electric demand period of the day for cooling.

The banks of electric immersion heaters 150 are then energized by drawing electric power from the utility electric power grid (or other source) to heat the thermal mass composition M to necessary operating temperatures for generating electricity.

In another scenario, the solar radiation incident on the solar collector 312 may be insufficient to heat the bed of thermal mass composition M to the necessary operating temperature due to cloud cover in some locations where the solar power generation system 300 might be sited. The electric immersion heaters 150 may be operated during off-peak demand periods of the power grid when energy costs are lowest if possible to recharge the thermal mass composition. Power is input to the heaters until the thermal mass composition M is heated to its normal operating temperature Tnm temperature and optimum heat retention capacity. Power is then terminated from the power source. The thermal mass composition is now fully thermally charged and in a standby condition ready for operation when needed for producing steam or hot water (or other heated heat transfer fluid) when the thermal energy systems of FIG. 1B or 1C demand.

A method or process for heating a heat transfer fluid using green boiler 120 will now be described and summarized. The method includes providing the thermal energy storage vessel 130 containing thermal mass composition M comprising a mixture of a metallic material and a phase change material each initially in the form of solid particles. The metallic material has a higher melting temperature than the phase change material. The method continues with heating the thermal mass composition to a temperature which melts the phase change material, with the metallic material however remaining as solid particles. The method continues with storing the heat in the thermal mass composition. The method continues with circulating one heat transfer fluid (e.g., second working fluid) associated with the power generation system 340 through the thermal mass composition, and heating the heat transfer fluid. The heating step may include: (1) flowing another transfer fluid (e.g., first working fluid) through the thermal mass composition; or (2) energizing a plurality of electric heaters embedded in the thermal mass composition. The circulating step may include flowing the second working fluid through a tube bundle embedded in the thermal mass composition. The tube bundle may be part of at least one heat exchanger 200 incorporated into the thermal energy storage vessel. The heated second working fluid may be in steam form or phase. The heating step may further include the melted phase change material flowing and filling interstitial spaces between the solid particles of the metallic material.

According to another aspect of the invention, the hybrid power generation system may be used to operate a Brayton power generation cycle using a suitable compressible gas such as air, carbon dioxide ($CO_2$), or other. Supercritical $CO_2$ may be used in some embodiments. The gas is the second working fluid for the power generation system portion of the hybrid system. The gas may be first compressed via a compressor which replaces the nuclear steam supply system (NSSS) 400 and flow through the second closed flow loop 341 to TES vessel 130 (green boiler). The gas is heated by the thermal mass composition M heated by solar or wind energy which increases the enthalpy of the gas. The gas then flows through a turbine-generator set similar to turbine-generator set 102, but operated via compressed gas in lieu of steam. The Brayton system can be visualized in FIG. 2 by insertion of a gas compressor 435 (represented schematically by dash lines) in the second closed flow loop 341 between the steam turbine 102 and inlet to TES vessel 130. Steam condenser 105 and feedwater pump 106 associated with the Rankine cycle are of course omitted. Brayton power generation cycle systems and equipment are well known in the art. It is well within the ambit of those skilled in the art to form a hybrid power generation system using the Bryton gas power generation cycle in lieu of the Rankine steam power generation cycle based on the information provided in the present disclosure.

It bears noting that unlike battery energy storage systems, the green boiler 120 disclosed herein does not use any rare earth or environmentally harmful materials. Also, unlike materials in batteries, the thermal mass composition M does not suffer the risk of degradation from aging effects which can ensure a long service life.

It further bears noting that the 24/7 solar power generation system shown in FIG. 2 depicts the classical Rankine cycle (steam based); however at the plant owner's option the system instead can use the gas-powered Brayton power generation cycle (e.g., carbon dioxide/$CO_2$ or other) which yields higher thermodynamic efficiency. The system can also use a bottoming Goswami cycle known in the art which is disclosed in Chapter 7: The Goswami cycle and its applications", G. Demirkaya, M. Levini, R. V. Padilla, and D. Yogi Goswami. Published January 2022, IOP Publishing Ltd, 2021, in either of these options to boost the thermodynamic efficiency even further.

Goswami Cycle

Figure 11:
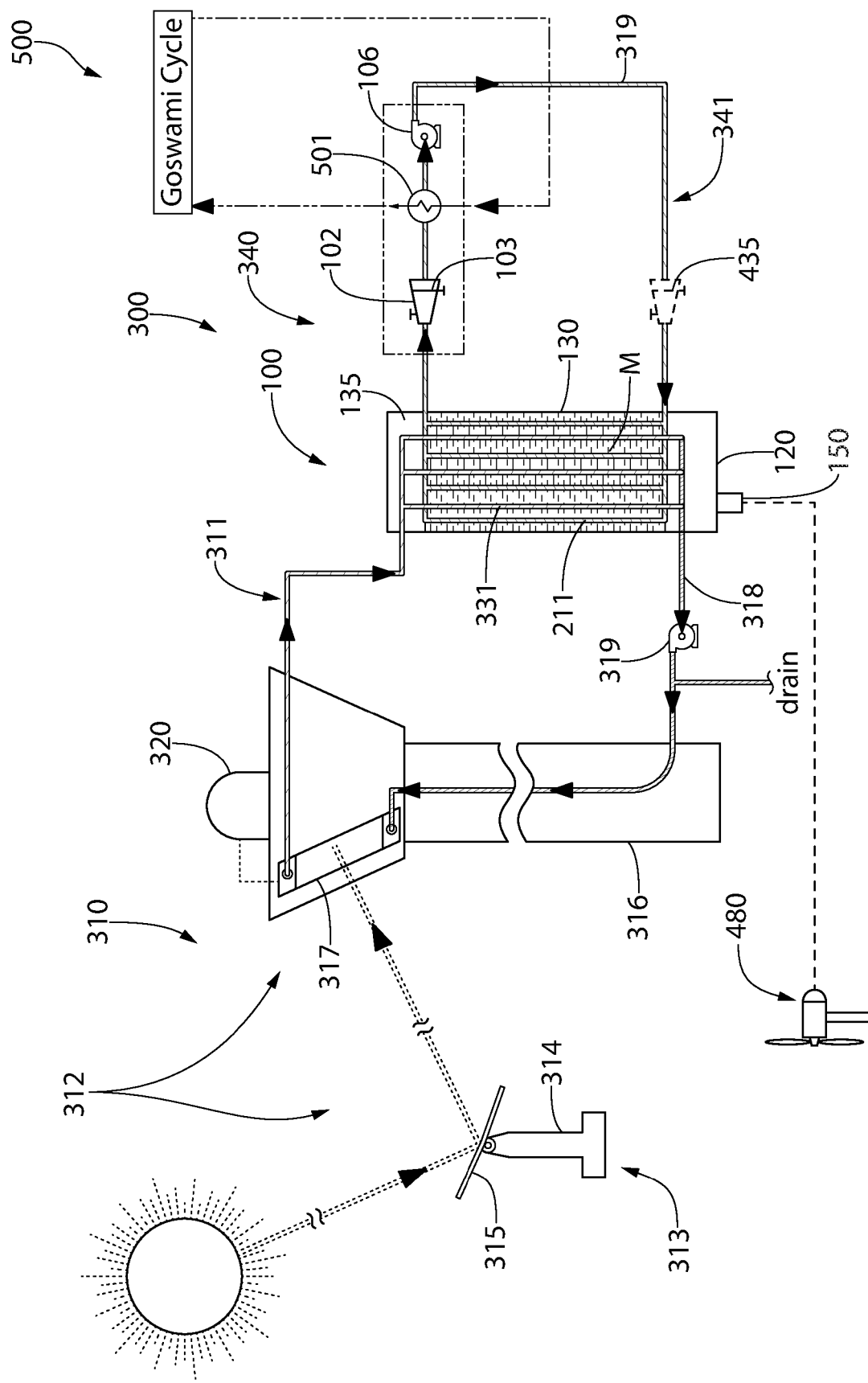
FIG. 11 is a schematic flow diagram of an alternative embodiment of the solar energy power generation system incorporating an optional Goswami bottoming cycle.
Figure 12:
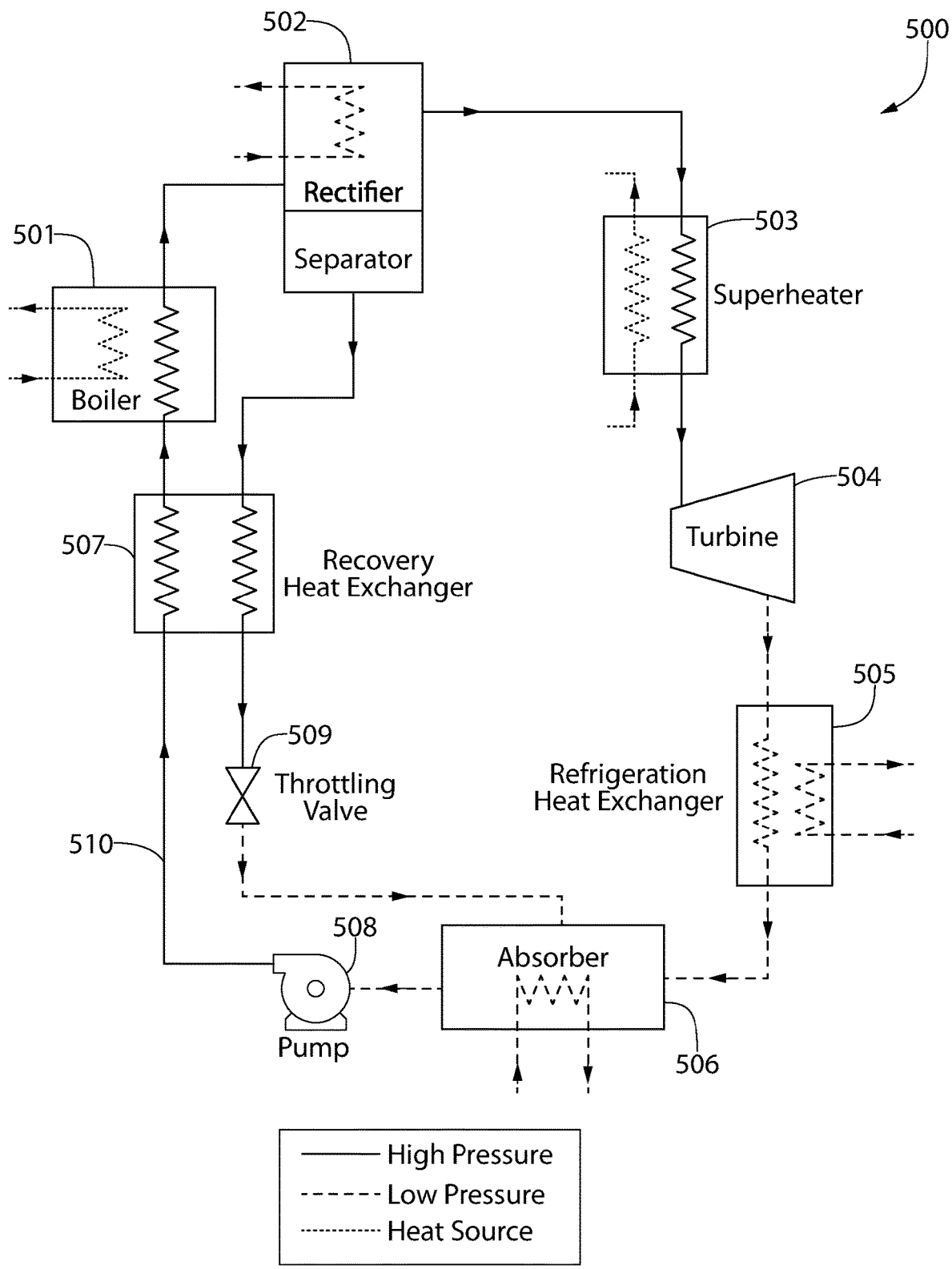
FIG. 12 is a schematic flow diagram of the Goswami bottoming cycle.

FIG. 11 is a system flow diagram modified to include an optional Goswami bottoming cycle which is operably interfaced with the main Rankine cycle power generation system 340 of FIG. 2 which includes turbogenerator 102-103. FIG. 12 is a schematic flow diagram showing the Goswami cycle in greater detail. The Goswami cycle is a cogeneration cycle which circulates a binary mixture working fluid (referenced to hereafter as "G working fluid" for brevity) in a flow loop 510 through a separate Goswami cycle system 500 that combines a separate second Rankine cycle and an absorption refrigeration cycle, thereby yielding both power generation and refrigeration in some embodiments. Any suitable binary mixture working fluid may be used have a first constituent substance and a second constituent substance which is more volatile than the first constituent substance. In one embodiment, a solution comprising a mixture of ammonia and water mixture may be used for the binary G working fluid as an example.

The condenser 105 of the Rankine cycle in FIG. 2 is replaced by boiler 501 of the Goswami cycle system 500 which extracts second heated working fluid (e.g., steam if water is used or gas such as $CO_2$ if a Brayton cycle is used) from the turbine 102. The system further includes in operable fluid communication within flow loop 510 an absorber 506, heat recovery heat exchanger 507, rectifier-separator 502, optional superheater 503, turbine 504, and refrigeration heat exchanger 505.

To briefly summarize operation of the Goswami cycle, the Goswami working fluid is pumped via pump 508 from absorber 506 through recovery heat exchanger 507 to the boiler 501 in flow loop 510. The Goswami working fluid leaves absorber 506 as a saturated liquid. The heat recovery heat exchanger 507 preheats the liquid Goswami working fluid to elevate its temperature before entering the boiler. The saturated liquid Goswami working fluid is preheated by absorbing heat in heat exchanger 507 from hotter Goswami working fluid (already heated in boiler 501) extracted from rectifier-separator 502.

In operation, the boiler heats the Goswami working fluid via the heated second working fluid extracted from turbine 102 to further elevate its temperature and produces a two-phase flow stream including a heated liquid phase and a heated vapor phase of the working fluid. The heated two phase mixture of Goswami working fluid flows to rectifier-separator 502, which separates the mixture into a heated vapor component and a heated liquid component; the latter which flows through the heat recovery heat exchanger 507 (as noted above) to initially raise the temperature of the Goswami working fluid from the absorber 506. In some embodiments, the vapor may be partially cooled in rectifier-separator 502 by passing a separate fluidic cooling medium colder than the vapor (and fluidly isolated therefrom) through rectifier-separator. This condenses out residual amounts of liquid entrained in the vapor within the rectifier-separator.

The heated liquid component of the Goswami working fluid from the rectifier-separator 502 is reduced in temperature in the heat recovery heat exchanger 507 after yielding its heat to the Goswami working fluid entering heat recovery heat exchanger 507 from absorber 506. The reduced temperature liquid leaving the heat recovery heat exchanger 507 is then sprayed into the absorber. Throttle valve 509 may be used to throttle the liquid flow entering the absorber from heat recovery heat exchanger 507.

The vaporous phase of the heated Goswami working fluid concurrently leaves rectifier-separator 502 and flows through flow loop 510 to refrigeration heat exchanger 505 still as a vapor. Optionally, in some embodiments, the heated vapor may first flow pass through superheater 503 which heats the vapor to superheated conditions. In either case, the vaporous Goswami working fluid expands in turbine 504 which may have an associated electric generator to produce electricity. The steam leaving the low pressure section of the turbine is condensed in refrigeration heat exchanger 505. The cooled condensate flows to absorber 506 to repeat the cycle.

Features of the solar power generation system disclosed herein may be summarized as follows.

Green boiler 120 in one embodiment may use a salt eutectic in the thermal mass composition that, when heated to a sufficiently high temperature (say, 600 Degrees C.) has a large energy release capacity before undergoing phase change (solidifying).

The salt eutectic may be seeded, if desired, with a salt species that boosts radiation heat transfer.

The layout and size of the heliostats is optimized to produce maximum Energy Capture Density of the land occupied by the power plant.

The thermal receivers on the power tower are located at the height that corresponds to the optimized heliostat layout. The receivers may be disposed on the hollow prismatic column referred to as the power tower and fluidly coupled to the expansion tank above and the first working fluid recirculation pump by suitably sized insulated riser piping with expansion joints to minimize thermal constraint stresses.

The receivers may each be a curved plate-like structure made of undulating sheet metal integrally welded to a thick back up plate to form a set of parallel "half tubes." The heat absorbing region of the receiver equipment is fluidly enclosed by headers at its two extremities (e.g., upper and lower).

The inside surface of the half tubes has micro-roughness patterns in the shape of cones to increase the heat transfer between the tube surface and the fluid flowing through the tubes.

The receiver headers can be configured to create multi-pass first working fluid (e.g., molten salt or heat transfer oil), if necessary, to gain the required amount of heat up for the cycle.

The expansion tank, which is partially filled with the first working fluid which may be molten salt and evacuated of oxygen and heat traced, serves to ensure that the solar collector system fluid would not go to a solid state.

A critical part of the solar power generation system is the green boiler 120 which has two discrete and fluidly isolated bundles of tubes; one tube bundle fluidly coupled to the solar collector to convey the first working fluid and heat the thermal mass composition, and the other tube bundle to heat the second working fluid and generate high pressure steam (Rankine cycle) or high temperature carbon dioxide (Brayton cycle) to produce electric power.

To ensure that the first working fluid (e.g., molten salt) does not freeze during a period of extended cloud cover, all vessels and piping in the first closed flow loop 311 may be heat-traced and heavily insulated to minimize loss of heat to the environment.

The green boiler 120 may be equipped with supplementary heat input capability in the form of electric immersion heaters that can extract electric power from the grid when the power is cheap, or wind turbine-generators on site.

The pressure and temperature of the steam produced in the green boiler can be selected to meet the needs of the plant owner. For example, the steam produced may be used to provide process steam to proximately-located industrial plants, for powering a hydrogen-generation facility, and other uses.

The prismatic power tower structure enables extremely tall columns to be built thus enabling multiple rows of receivers to be installed and operated at different elevations. The riser piping is enclosed in the power tower thereby reducing the effect of heat dissipaters such as wind and rain.

The cylindrical cross section of the power tower enables receivers to be installed in multiple circumferential orientations such that Sun's heat can be more fully captured where its trajectory in the sky is favorable to such design.

It may be more efficient to position receivers at multiple elevations in a sufficiently tall power tower so that heat can be more effectively captured from a large heliostat field.

One significant attribute of the solar power generation system is its ability to provide power "on-demand" or continuously at the owner's option. Thus, it can serve as a base load unit or as a "peaker" (peak generation unit) to best meet the needs of the consumer.

Although FIG. 2 a single green boiler 120 (TES vessel 130) which may be as much as 60 feet tall, a multiple green boiler array with each green boiler acting in parallel through parallel flow fluid coupling may be used to transfer heat from the first working fluid (e.g., molten salt or heat transfer oil) to the thermal mass composition contained in the array of green boilers.

Where the demand for pressure and temperature of steam is relatively moderate, a suitable synthetic oil may be used as the heat transfer fluid. Synthetic oils can be used effectively where <400 degree C. (Celsius) maximum temperature limit can be maintained. Because of their low freezing point, a solar collector using a synthetic oil may not need heat tracing of the system's piping and vessels.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A solar power generation system comprising:
a thermal energy storage vessel defining an internal space containing a thermal mass composition operable to store thermal energy;
a solar energy collection system comprising a first closed flow loop including a solar collector configured to absorb solar energy and heat a first working fluid, the first closed flow loop configured to circulate the heated first working fluid through and heat the thermal mass composition in the thermal energy storage vessel;
a power generation system comprising a second closed flow loop including a turbine, the second closed flow loop configured to circulate a second working fluid through the thermal energy storage vessel to absorb thermal energy from the thermal mass composition and heat the second working fluid for introduction to the turbine;
an electric generator operably coupled to the turbine to produce electricity;
wherein the solar collector is a concentrated solar power unit comprising a plurality of heliostats each comprising a reflector and a centrally-located power tower comprising a plurality of thermal receivers which form a fluidic part of the first closed flow loop, the reflectors being operable to direct sunlight onto the thermal receivers to heat the first working fluid which flows through the thermal receivers;
further comprising a preheater configured to preheat the first working fluid in a cooled condition returned to the solar collector from the thermal energy storage vessel using an extracted portion of the heated first working fluid leaving the solar collector which is drawn from the first closed flow loop;
wherein the preheater is fluidly coupled to a bypass piping loop configured to flow the extracted portion of the heated first working fluid through the preheater and heat the cooled first working fluid flowing through but fluidly isolated from the extracted portion;
wherein the preheater is a shell and tube heat exchanger, the heated first working fluid flowing on a shell-side of the heat exchanger and the cooled first working fluid flowing through tube-sides of a plurality of heat exchange tubes extending through the preheater.

2. The system according to claim 1, wherein the heated first working fluid flows downwards through the preheater and the cooled first working fluid flows upwards through the preheater.

* * * * *